US012124534B2

(12) United States Patent
Kondo

(10) Patent No.: US 12,124,534 B2
(45) Date of Patent: Oct. 22, 2024

(54) METHOD FOR GENERATING A PLURALITY OF SETS OF TRAINING IMAGE DATA FOR TRAINING MACHINE LEARNING MODEL

(71) Applicant: BROTHER KOGYO KABUSHIKI KAISHA, Nagoya (JP)

(72) Inventor: Masaki Kondo, Toyoake (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 298 days.

(21) Appl. No.: 17/542,718

(22) Filed: Dec. 6, 2021

(65) Prior Publication Data

US 2022/0180122 A1 Jun. 9, 2022

(30) Foreign Application Priority Data

Dec. 9, 2020 (JP) ................................ 2020-203996

(51) Int. Cl.
*G06K 9/00* (2022.01)
*G06F 18/214* (2023.01)
(Continued)

(52) U.S. Cl.
CPC .............. *G06F 18/214* (2023.01); *G06T 3/20* (2013.01); *G06T 3/40* (2013.01); *G06T 3/60* (2013.01);
(Continued)

(58) Field of Classification Search
CPC . G06F 18/214; G06T 3/20; G06T 3/40; G06T 3/60; G06T 7/90; G06T 2207/20081
See application file for complete search history.

(56) References Cited

U.S. PATENT DOCUMENTS 8,111,923 B2 * 2/2012 Csurka ................. G06V 10/464
382/190
2012/0148162 A1 * 6/2012 Zhang ....................... G06T 7/11
382/195
(Continued)

FOREIGN PATENT DOCUMENTS

CN 105809181 A * 7/2016
CN 105809181 B * 6/2019
(Continued)

OTHER PUBLICATIONS

You Only Look Once:Unified, Real-Time Object Detection, Joseph Redmon et al., CVF, 2016, pp. 779-788 (Year: 2016).*
(Continued)

*Primary Examiner* — Jayesh A Patel
(74) *Attorney, Agent, or Firm* — Baker Botts L.L.P.

(57) ABSTRACT

A method for generating a plurality of sets of training image data for training a machine learning model includes: (a) acquiring object image data representing an object image; (b) dividing the object image into T number of partial object images by dividing a region of the object image into T number of partial regions corresponding to respective ones of T number of partial color ranges; (c) generating a plurality of sets of color-modified object image data representing respective ones of a plurality of color-modified object images by performing an adjustment process on the object image data, the adjustment process including a color modification process to modify colors of at least one of the T number of partial object images; and (d) generating the plurality of sets of training image data using one or more sets of background image data and the plurality of sets of color-modified object image data.

11 Claims, 17 Drawing Sheets

(51) Int. Cl.

| | |
|---|---|
| ***G06T 3/20*** | (2006.01) |
| ***G06T 3/40*** | (2006.01) |
| ***G06T 3/60*** | (2006.01) |
| ***G06T 7/90*** | (2017.01) |

(52) U.S. Cl.

CPC ...... *G06T 7/90* (2017.01); *G06T 2207/20081* (2013.01); *G06T 2207/20084* (2013.01)

(56) References Cited

U.S. PATENT DOCUMENTS

| | | | | |
|---|---|---|---|---|
| 2015/0170002 | A1* | 6/2015 | Szegedy | G06V 30/194 382/156 |
| 2018/0293734 | A1* | 10/2018 | Lim | G06N 3/045 |
| 2019/0026558 | A1* | 1/2019 | Tanigawa | G06T 19/20 |
| 2020/0042794 | A1* | 2/2020 | Ishikawa | G06V 20/20 |
| 2020/0134834 | A1* | 4/2020 | Pao | G06T 7/11 |
| 2020/0302656 | A1* | 9/2020 | Kumar | G06T 7/90 |
| 2020/0372662 | A1* | 11/2020 | Pereira | G06T 7/60 |
| 2021/0225037 | A1* | 7/2021 | Aydin | G06T 3/40 |
| 2021/0248418 | A1* | 8/2021 | Guo | G06T 7/194 |
| 2022/0058436 | A1* | 2/2022 | Sun | A63F 13/52 |
| 2022/0101047 | A1* | 3/2022 | Puri | G06T 5/30 |

FOREIGN PATENT DOCUMENTS

| | | | | |
|---|---|---|---|---|
| EP | 2154631 | A2 * | 2/2010 | G06K 9/00624 |
| EP | 2670125 | A1 * | 12/2013 | G06K 9/4652 |
| JP | 2016-062225 | A | 4/2016 | |
| JP | 2018-169672 | A | 11/2018 | |
| JP | 2019-023858 | A | 2/2019 | |
| JP | 2019-207662 | A | 12/2019 | |
| JP | 2020-013467 | A | 1/2020 | |
| JP | 2020-024665 | A | 2/2020 | |
| JP | 2020-087165 | A | 6/2020 | |
| JP | 2020-166397 | A | 10/2020 | |

OTHER PUBLICATIONS

International Search Report and Written Opinion mailed Mar. 8, 2022 in International Application No. PCT/JP2021/045408.

Jo et al., "Data Augmentation using Synthesized Images for Object Detection," 2017, 17th International Conference on Control, Automation and Systems (ICCAS 2017) Oct. 18-21, 2017, Ramada Plaza, Jeju, Korea, pp. 1035-1038.

Shin et al., "Data Augmentation Method of Object Detection for Deep Learning in Maritime Image," 2020 IEEE International Conference on Big Data and Smart Computing (BigComp) pp. 463-466.

* cited by examiner

METHOD FOR GENERATING A PLURALITY OF SETS OF TRAINING IMAGE DATA FOR TRAINING MACHINE LEARNING MODEL

CROSS REFERENCE TO RELATED APPLICATIONS

This application claims priority from Japanese Patent Application No. 2020-203996 filed Dec. 9, 2020. The entire content of the priority application is incorporated herein by reference.

BACKGROUND

Machine learning models have conventionally been used to process images. Training data is used to train a machine learning model. One proposed technology is as follows. An automobile is equipped with a target object recognition device. The target object recognition device uses a recognition model that has been trained using training data to detect a target object in a captured image. Three-dimensional computer graphics data is used for generating the training data. Scene data is generated from the three-dimensional computer graphics data. The scene data includes animation information that indicates changes in object models within a scene projected onto a camera model. Here, all models other than a specific object model are deleted from the scene data, and the specific object model is set to a specific color, thereby producing scene data for the generation of training data that includes only the specific object model. An image of the scene projected on the camera model is generated from the scene data. An annotation frame is superimposed on this image. The annotation frame is a polygon, such as a rectangle, that circumscribes the region occupied by the specific object model.

SUMMARY

Various image data representing a target object is used for training the machine learning model to detect the target object. However, the generation of such large quantities of image data is not easy, and there remains room for improvement.

In view of the foregoing, it is an object of the present disclosure to provide a technique for generating a plurality of sets of training image data for training a machine learning model.

In order to attain the above and other objects, the present disclosure provides a method for generating a plurality of sets of training image data for training a machine learning model. The machine learning model is used for detecting a target object in an image. The method includes: (a) acquiring; (b) dividing; (c) generating; and (d) generating. The (a) acquiring acquires object image data representing an object image. The object image includes a plurality of pixels. The object image data includes a plurality of color values corresponding to respective ones of the plurality of pixels. The (b) dividing divides the object image into T number of partial object images by dividing a region of the object image into T number of partial regions corresponding to respective ones of the T number of partial color ranges. The T number of partial color ranges is obtained by dividing a distribution range of the plurality of color values, T is an integer greater than or equal to two. The (c) generating generates a plurality of sets of color-modified object image data representing respective ones of a plurality of color-modified object images by performing an adjustment process on the object image data. The adjustment process performed on the object image data includes a color modification process to modify colors of at least one of the T number of partial object images in the object image. The plurality of color-modified object images includes respective ones of a plurality of color modified partial object images each of which corresponds to a specific partial region included in the T number of partial regions. The plurality of color-modified partial object images has different colors from each other. The (d) generating generates a plurality of sets of training image data using one or more sets of background image data and the plurality of sets of color-modified object image data. The one or more sets of background image data representing respective ones of one or more background images. The plurality of sets of training image data represents respective ones of a plurality of training images. Each of the plurality of training images includes a single background image from among the one or more background images and at least one color-modified object image from among the plurality of color-modified object images. The at least one color-modified object image is arranged over the single background image. The plurality of training images includes respective ones of mutually different color-modified object images from among the plurality of color-modified object images.

According to another aspect, the present disclosure also provides a system for generating a plurality of sets of training image data for training a machine learning model. The machine learning model is sued for detecting a target object in an image. The system includes a controller. The controller is configured to perform: (a) acquiring; (b) dividing; (c) generating; and (d) generating. The (a) acquiring acquires object image data representing an object image. The object image includes a plurality of pixels. The object image data includes a plurality of color values corresponding to respective ones of the plurality of pixels. The (b) dividing divides the object image into T number of partial object images by dividing a region of the object image into T number of partial regions corresponding to respective ones of the T number of partial color ranges. The T number of partial color ranges is obtained by dividing a distribution range of the plurality of color values, T is an integer greater than or equal to two. The (c) generating generates a plurality of sets of color-modified object image data representing respective ones of a plurality of color-modified object images by performing an adjustment process on the object image data. The adjustment process performed on the object image data includes a color modification process to modify colors of at least one of the T number of partial object images in the object image. The plurality of color-modified object images includes respective ones of a plurality of color modified partial object images each of which corresponds to a specific partial region included in the T number of partial regions. The plurality of color-modified partial object images has different colors from each other. The (d) generating generates a plurality of sets of training image data using one or more sets of background image data and the plurality of sets of color-modified object image data. The one or more sets of background image data representing respective ones of one or more background images. The plurality of sets of training image data represents respective ones of a plurality of training images. Each of the plurality of training images includes a single background image from among the one or more background images and at least one color-modified object image from among the plurality of color-modified object images. The at least one color-modified object image is arranged over the single background image. The plurality of training images includes respective ones of mutually different color-modified object images from among the plurality of color-modified object images.

According to still another aspect, the present disclosure also provides a non-transitory computer readable storage medium storing a set of computer-readable instructions for a computer configured to generate a plurality of training image data for training a machine learning model. The machine learning model is used for detecting a target object in an image. The set of computer-readable instructions includes: (a) acquiring; (b) dividing; (c) generating; and (d) generating. The (a) acquiring acquires object image data representing an object image. The object image includes a plurality of pixels. The object image data includes a plurality of color values corresponding to respective ones of the plurality of pixels. The (b) dividing divides the object image into T number of partial object images by dividing a region of the object image into T number of partial regions corresponding to respective ones of the T number of partial color ranges. The T number of partial color ranges is obtained by dividing a distribution range of the plurality of color values, T is an integer greater than or equal to two. The (c) generating generates a plurality of sets of color-modified object image data representing respective ones of a plurality of color-modified object images by performing an adjustment process on the object image data. The adjustment process performed on the object image data includes a color modification process to modify colors of at least one of the T number of partial object images in the object image. The plurality of color-modified object images includes respective ones of a plurality of color modified partial object images each of which corresponds to a specific partial region included in the T number of partial regions. The plurality of color-modified partial object images has different colors from each other. The (d) generating generates a plurality of sets of training image data using one or more sets of background image data and the plurality of sets of color-modified object image data. The one or more sets of background image data representing respective ones of one or more background images. The plurality of sets of training image data represents respective ones of a plurality of training images. Each of the plurality of training images includes a single background image from among the one or more background images and at least one color-modified object image from among the plurality of color-modified object images. The at least one color-modified object image is arranged over the single background image. The plurality of training images includes respective ones of mutually different color-modified object images from among the plurality of color-modified object images.

The above configuration allows for the generation of a plurality of sets of training image data representing images of a target object represented in various colors.

The technique disclosed herein can be realized in various forms, such as a method and a device for identifying information to be associated with image data, a method and a device for associating information with image data, a method and a device for generating training image data, a set of computer-readable instructions for realizing a function of such method or device, a storage medium (e.g., a non-transitory storage medium) storing such computer-readable instructions, and the like.

BRIEF DESCRIPTION OF THE DRAWINGS

The particular features and advantages of the disclosure as well as other objects will become apparent from the following description taken in connection with the accompanying drawings, in which.

DETAILED DESCRIPTION

A. Embodiment

<A1. Device Configuration>

Figure 1:
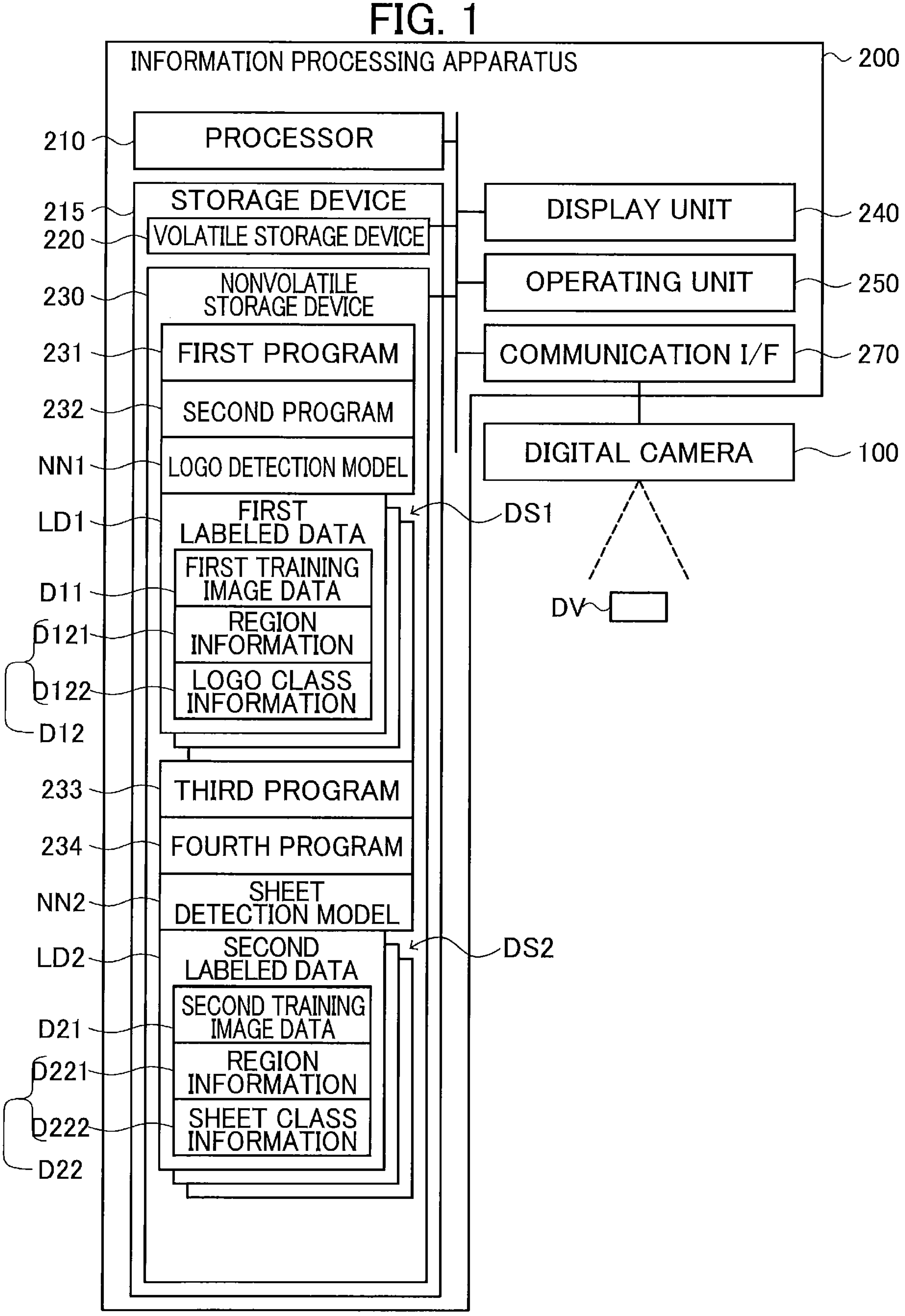
FIG. 1 is a block diagram illustrating an information processing apparatus according to one embodiment of the present disclosure.

FIG. 1 is a block diagram showing an information processing apparatus 200 according to one embodiment. The information processing apparatus 200 according to the present embodiment is a personal computer, for example. The information processing apparatus 200 executes various processes for training a machine learning model to be used for inspecting objects (products such as printers, for example).

The information processing apparatus 200 is provided with a processor 210, a storage device 215, a display unit 240, an operating unit 250, and a communication interface 270. The above components are interconnected via a bus. The storage device 215 includes a volatile storage device 220, and a nonvolatile storage device 230.

The processor 210 is a device configured to perform data processing. The processor 210 is a central processing unit (CPU), for example. The volatile storage device 220 is dynamic random access memory (DRAM), for example. The nonvolatile storage device 230 is flash memory, for example. The nonvolatile storage device 230 stores programs 231, 232, 233, and 234; a logo detection model NN1; a first dataset DS1 for training the logo detection model NN1; a sheet detection model NN2; and a second dataset DS2 for training the sheet detection model NN2. The models NN1 and NN2 are machine learning models. In the present embodiment, the models NN1 and NN2 are program modules. The programs 231 through 234, the models NN1 and NN2, and the datasets DS1 and DS2 will be described later in greater detail.

The display unit 240 is a device configured to display images, such as a liquid crystal display (LCD) or an organic light-emitting diode (OLED) display. The operating unit 250 is a device that accepts user operations, such as a touch-screen arranged over the display unit 240, buttons, levers, and the like. By operating the operating unit 250, the user can input various requests and instructions into the information processing apparatus 200. The communication interface 270 is an interface for communicating with other devices. For example, the communication interface 270 may be a universal serial bus (USB) interface, a wired local area network (LAN) interface, or a wireless communication interface conforming to the IEEE 802.11 standard. A digital camera 100 is connected to the communication interface 270. The digital camera 100 is configured to photograph an object DV being inspected and generates image data of the photographed image. In the following description, the object DV being inspected will be a printer. Hereinafter, the object DV being inspected will be called the "printer DV."

<A2. Photographed Image>

Figure 2B:
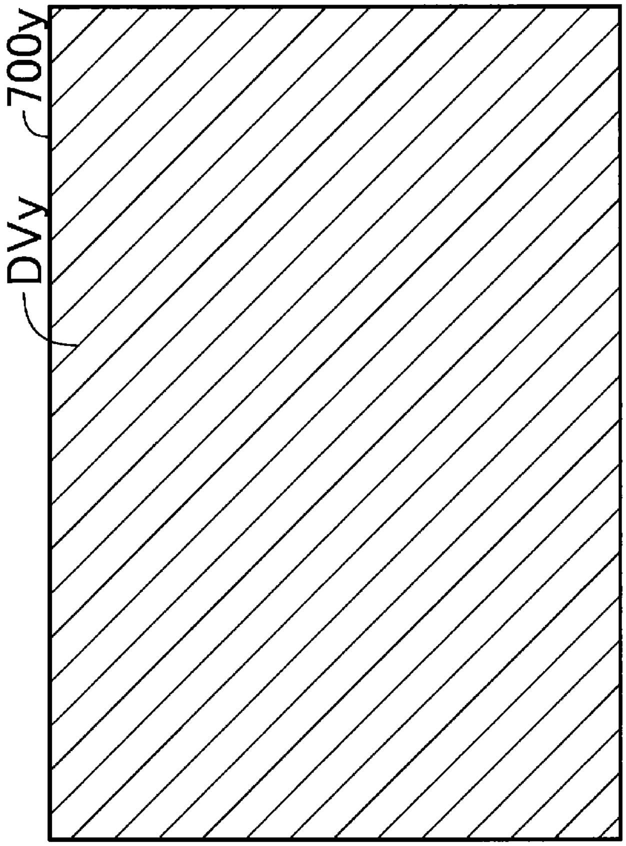
FIGS. 2A and 2B are schematic diagrams illustrating examples of photographed images.
Figure 2A:
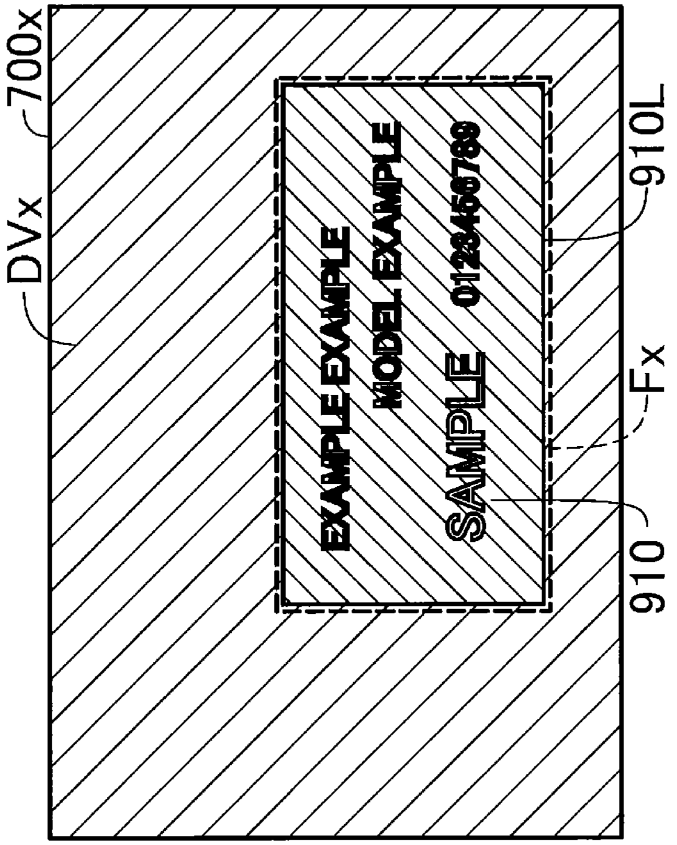

FIGS. 2A and 2B are schematic diagrams showing examples of photographed images. FIG. 2A shows a first photographed image 700*x* of a first printer DVx with no defects. A label sheet 910L (also simply called a "sheet 910L") is affixed to the first printer DVx. The first photographed image 700*x* includes an image of the sheet 910L. FIG. 2B shows a second photographed image 700*y* of a second printer DVy that is defective. A sheet 910L is not affixed to the second printer DVy and, hence, an image of the sheet 910L is not included in the second photographed image 700*y*. The inspection described below is performed to determine whether a suitable label sheet is affixed to the printer.

In the present embodiment, the sheet 910L includes a logo image 910. The logo image 910 in this example is the character string "SAMPLE". The sheet 910L includes other regions in addition to the region occupied by the logo image 910, such as regions showing images of other character strings. The logo is not limited to a character string but may be an image of any of various objects, such as a graphic, mark, or symbol. Further, the sheet 910L may be provided with a variety of types of elements, such as graphics, patterns, and photographs and is not limited to character strings.

The sheet detection model NN2 (see FIG. 1) is a machine learning model that detects images of label sheets using photographed image data, which is image data representing a photographed image. For example, the sheet detection model NN2 detects the image of a label sheet such as the sheet 910L from a photographed image of a printer. The result of a printer inspection is "pass" when an image of a label sheet is detected and "fail" when an image of a label sheet is not detected.

The sheet detection model NN2 is trained using image data for various images that include an image of a sheet. Various information is associated with data used in training (image data in this case). The process for associating information with data is called "annotation" or "labeling." Hereinafter, information associated through annotation will be called "annotation information." In the present embodiment, annotation information includes region information identifying a region containing the sheet being detected. When image data for the first photographed image 700*x* shown in FIG. 2A is used for training, for example, the annotation information includes region information specifying a frame Fx surrounding the sheet 910L.

Normally, an operator sets the annotation information. For example, the operator sets the frame Fx around the sheet 910L while viewing the first photographed image 700*x*. Various image data is also used for training. For example, the displayed state of the sheet, such as the position, color, and size of the sheet, may differ among a plurality of sets of image data. The operator cannot easily set suitable annotation information for each of the various sets of image data. The operator may set an inappropriate frame that only surrounds a portion of the sheet 910L, for example. Therefore, the information processing apparatus 200 in the present embodiment (see FIG. 1) uses the logo detection model NN1 to detect a logo image (the logo image 910, for example) from images used for training. Next, the information processing apparatus 200 sets an expanded region that includes a logo region constituting the region of the logo image, and a portion of the image outside the logo region. The expanded region can suitably indicate a sheet (the sheet 910L, for example). Next, the information processing apparatus 200 associates annotation information including region information specifying the expanded region with the image data. Below, descriptions will be given for the logo detection model NN1 and the sheet detection model NN2.

<A3. Configuration of the Logo Detection Model NN1>

Figure 3A:
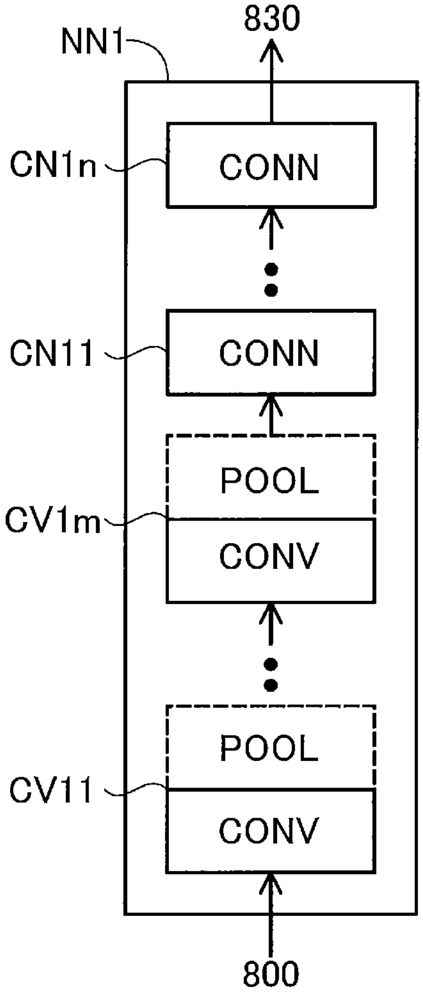
FIG. 3A is a schematic diagram illustrating an example of the configuration of a logo detection model.

FIG. 3A is a schematic diagram showing an example of the configuration of the logo detection model NN1. In the present embodiment, the logo detection model NN1 is an object detection model called you only look once (YOLO). YOLO was disclosed in an article by Joseph Redmon, Santosh Divvala, Ross Girshick, and Ali Farhadi entitled "You Only Look Once: Unified, Real-Time Object Detection," published in Proceedings of the IEEE Conference on Computer Vision and Pattern Recognition (CVPR), 2016, pp. 779-788. The YOLO model uses a convolutional neural network to predict frames called bounding boxes that include objects, the confidence that a box contains an object, and probabilities for the types of objects when a box contains an object (called class probabilities).

As shown in FIG. 3A, the logo detection model NN1 has m number of convolutional layers CV11 through CV1*m* (where m is an integer greater than or equal to one), and n number of fully connected layers CN1 through CN1*n* (where n is an integer greater than or equal to one) following the series of convolutional layers CV11 through CV1*m*. For example, m may be twenty-four and n may be two. A pooling layer is provided directly after each of one or more convolutional layers among the m number of convolutional layers CV11 through CV1*m*.

The convolutional layers CV11 through CV1*m* each executes a process on the input data that includes a convolution process and a bias-adding process. The convolution process is a process for calculating correlation values indicating correlations between input data and filters while successively applying s number of filters with (p×q×r) dimensions to the input data (where p, q, r, and s are integers greater than or equal to one). In the process for applying each filter, a plurality of correlation values is calculated sequentially while sliding the filter over the input data. One filter includes (p×q×r) number of weights. The bias-adding process is performed to add a bias to the calculated correlation values. One bias is prepared for each filter. Normally, the numbers of filters used and the dimensions (p×q×r) of the filters differ among them number of convolutional layers CV11 through CV1*m*. Each of the convolutional layers CV11 through CV1*m* has a parameter set that includes a plurality of weights for each of the filters and a plurality of biases for the plurality of filters.

The pooling layers execute a process for reducing the number of dimensions of data inputted from the preceding convolutional layer. Various processes such as average pooling or max pooling may be used as the pooling process. The pooling layers in the present embodiment perform max pooling. Max pooling reduces the number of dimensions by selecting the largest value within a window of a prescribed size (2×2, for example) while sliding the window by a prescribed stride (2, for example).

Each of the fully connected layers CN11 through CN1*n* uses f-dimensional data inputted from the preceding layer (i.e., f number of values, where f is an integer greater than or equal to two) to output g-dimensional data (i.e., g number of values, where g is an integer greater than or equal to two). Each of the g number of outputted values is obtained by adding the bias to the dot product of the vector configured by the f number of inputted values and the vector configured by the f number of weights (dot product+bias). Each of the fully connected layers CN11 through CN1*n* outputs g-dimensional data using the (f×g) number of weights and the g number of biases. Note that the number of dimensions f for the input data and the number of dimensions g for the output data are normally different among the n number of fully connected layers CN11 through CN1*n*. Each of the fully connected layers CN11 through CN1*n* has a parameter set that includes a plurality of weights and a plurality of biases.

Note that data generated by the convolutional layers CV11 through CV1*m* and fully connected layers CN11 through CN1*n* is inputted into an activation function for conversion. While various functions may be used as the activation function, in the present embodiment a linear activation function is used in the final layer (the fully connected layer CN1*n* in this case) and a leaky rectified linear unit (LReLU) is used in the other layers.

Figure 3B:
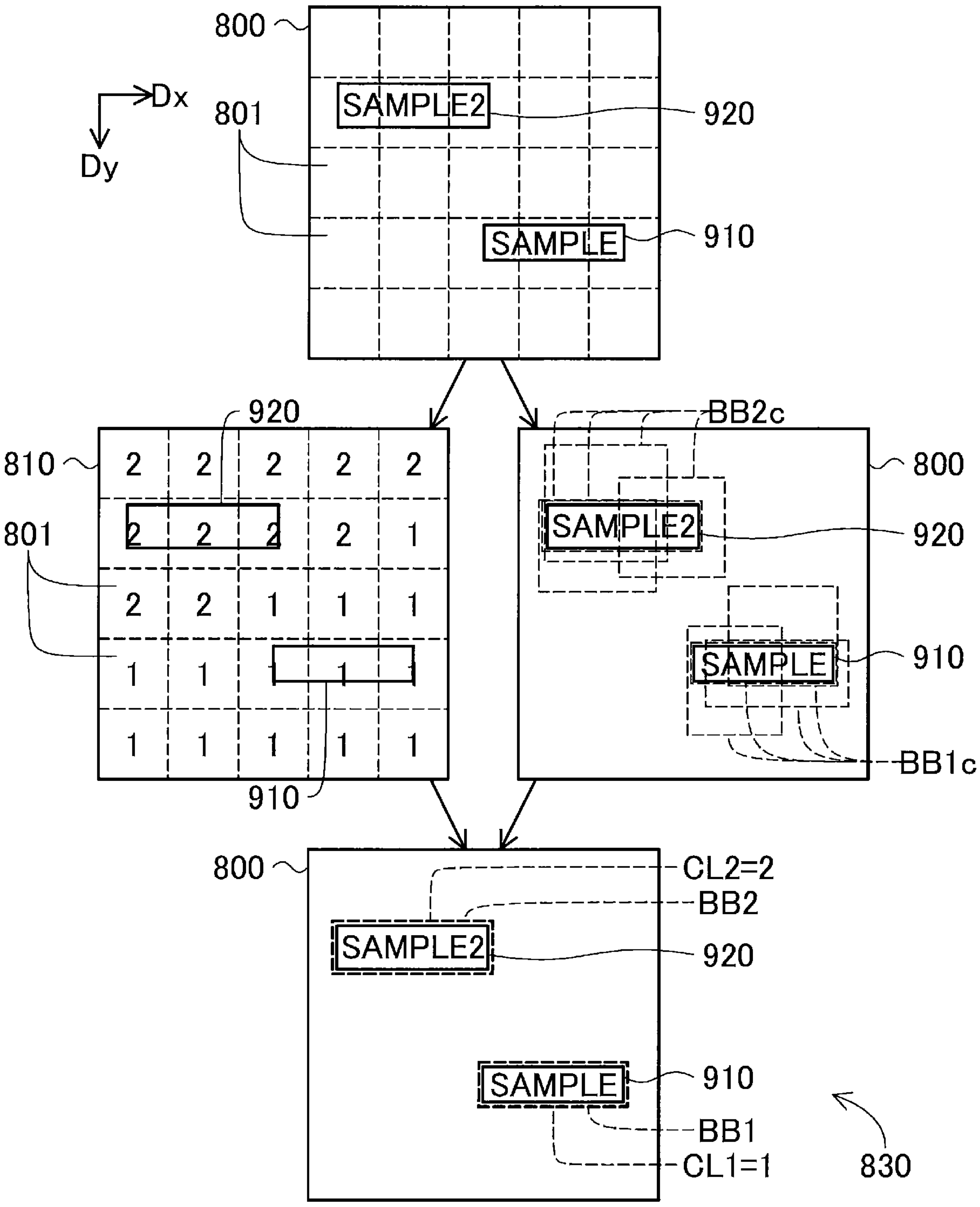
FIG. 3B is a schematic diagram illustrating an overview of operations of the logo detection model.

FIG. 3B is a schematic diagram showing an overview of the operations of the logo detection model NN1. An image 800 is an example of an input image that is inputted into the logo detection model NN1. The input image 800 is represented by color values for a plurality of pixels arranged in a matrix configuration having a first direction Dx, and a second direction Dy orthogonal to the first direction Dx. Each color value in the present embodiment is represented by three component values for red (R), green (G), and blue (B). The input image 800 in the example of FIG. 3B shows two types of logo images 910 and 920. The first logo image 910 in the present embodiment is an image of the character string "SAMPLE." The second logo image 920 is a different logo image from the first logo image 910, and specifically an image of the character string "SAMPLE2."

The logo detection model NN1 divides the input image 800 into S×S number (where S is an integer greater than or equal to two, such as five) of grid cells 801 (hereinafter simply called "cells 801"). The center of each of the logo images 910 and 920 is included in one of the cells 801. The detection result for the logo image 910 or 920 (and more generally an object) is represented by a prediction value associated with the cell 801 that contains the center of the object region (described later in greater detail).

Bn number of rectangular bounding boxes are associated with each cell 801 (where Bn is an integer greater than or equal to one, such as two). The center-right diagram in FIG. 3B shows an example of the bounding boxes including a plurality of first bounding boxes BB1*c* related to the first logo image 910, and a plurality of second bounding boxes BB2*c* related to the second logo image 920. The following five prediction values are associated with each bounding box: a center position x of the box in the first direction Dx relative to the cells 801, a center position y of the box in the second direction Dy relative to the cells 801, a width w of the box in the first direction Dx, a height h of the box in the second direction Dy, and a confidence. When a cell 801 does not contain the center of the object region, the confidence for the bounding box associated with that cell 801 is expected to be zero. If the center of the object region is contained in the cell 801, the confidence for the bounding box associated with that cell 801 is expected to be high. Specifically, the confidence is expected to be equivalent to the intersection over union (IOU) between the region of the bounding box and the object region. Here, the IOU is a ratio found by dividing the area of the intersection between two regions by the area of the union between the two regions. This confidence indicates the degree that the bounding box matches the object region. Note that the confidence is calculated independently of the object type.

In this example, the logo detection model NN1 will detect C number of types of logo images (where C is an integer greater than or equal to one, such as three). The type of a logo image is also called a "class" or a "logo class." C number of class probabilities are also associated with each cell 801. The C number of class probabilities are respectively associated with the C number of types of objects (logo images in this case). The class probabilities are conditioned on the cell 801 containing the center of the object region and indicate the probability for each type of object. C number of class probabilities are associated with one cell 801 regardless the total number Bn of bounding boxes associated with one cell 801. The diagram in the center-left of FIG. 3B shows a class probability map 810. The class probability map 810 shows class identifiers identified for each cell 801 and indicates the class identifier corresponding to the highest class probability. As shown in the drawing, the probability of the class identifier "1" indicating the type of the first logo image 910 is high in cells 801 near the first logo image 910. The probability of the class identifier "2" indicating the type of the second logo image 920 is high in cells 801 near the second logo image 920. The plurality of first bounding boxes BB1*c* in the center-right portion of the drawing is associated with cells 801 having the class identifier "1" in the class probability map 810. The plurality of second bounding boxes BB2*c* is associated with cells 801 having the class identifier "2" in the class probability map 810.

The logo detection model NN1 (see FIG. 3A) outputs output data 830 specifying S×S×(Bn×5+C) number of prediction values. Bounding boxes among the S×S×Bn number of bounding boxes that have a confidence of at least a threshold value are adopted as boxes (hereinafter called "object boxes") indicating detected objects (logo images in this case). Further, the class identifier corresponding to the highest class probability among the C number of class probabilities associated with an object box is adopted as the class identifier associated with the object box. As shown in the center-right diagram of FIG. 3B, a single logo image may have a plurality of overlapping bounding boxes as candidates for the object box. A process called "non-maximal suppression" may be performed to select one bounding box from the plurality of overlapping bounding boxes. This process deletes one of two boxes (the box having the lower confidence, for example) when the IOU between the two boxes is greater than or equal to a reference value. One object box is detected for a single logo image by repeatedly performing this process until a single object box remains. In the example shown in the bottom of FIG. 3B, a first object box BB1 (having class identifier CL1=1) is detected for the first logo image 910 and a second object box BB2 (having class identifier CL2=2) is detected for the second logo image 920.

<A4. Generation Process for Generating the First Dataset DS1>

Figure 4:
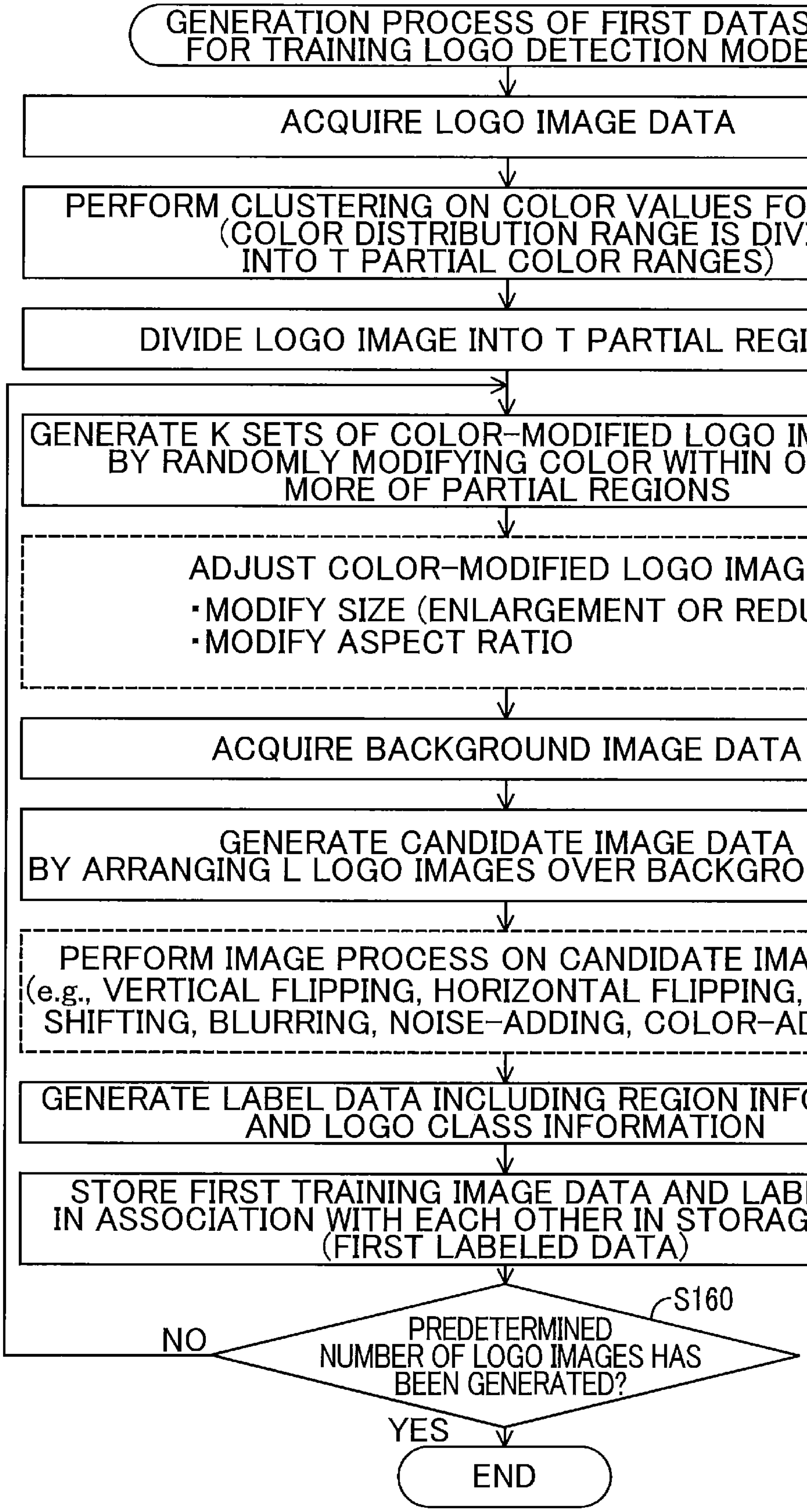
FIG. 4 is a flowchart illustrating an example of steps in a generation process for generating a first dataset for training the logo detection model.

FIG. 4 is a flowchart showing an example of a generation process for generating the first dataset DS1 for training the logo detection model NN1. The processor 210 (see FIG. 1) executes the process in FIG. 4 according to the first program 231.

Figure 5A:
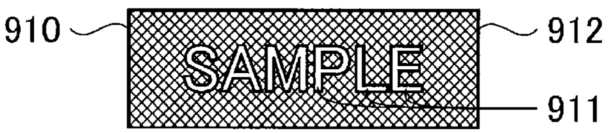
FIG. 5A is an explanatory diagram illustrating an example of a logo image.

In S110 of FIG. 4, the processor 210 acquires logo image data. The logo image data is image data representing logo images. In the present embodiment, the logo image data is RGB bitmap data and is pre-stored in the nonvolatile storage device 230 (the logo image data is not shown in FIG. 1). FIG. 5A is an explanatory diagram showing an example of a logo image. In this example, the logo image is the first logo image 910. The first logo image 910 includes a text region 911, and a background region 912. The plurality of pixels in the text region 911 have roughly the same color, and the plurality of pixels in the background region 912 have roughly the same color. The logo image data may be generated using an application program for editing images. Alternatively, the logo image data may be generated by a scanner (not shown) that reads a logo sample. In the present embodiment, the processor 210 acquires data for a plurality of logo images including data for the first logo image 910, data for the second logo image 920 (see FIG. 3B), and data for a third logo image (not shown in FIG. 3B, but to be shown later). Although not indicated in the drawings, both the second logo image 920 and the third logo image include a text region representing a plurality of characters, and a background region, as in the first logo image 910.

In S115 of FIG. 4, the processor 210 performs clustering on color values for the plurality of pixels in the logo image. Through clustering, the distribution range of color values in the logo image is divided into T number of partial color ranges (where T is an integer greater than or equal to two).

Figure 5B:
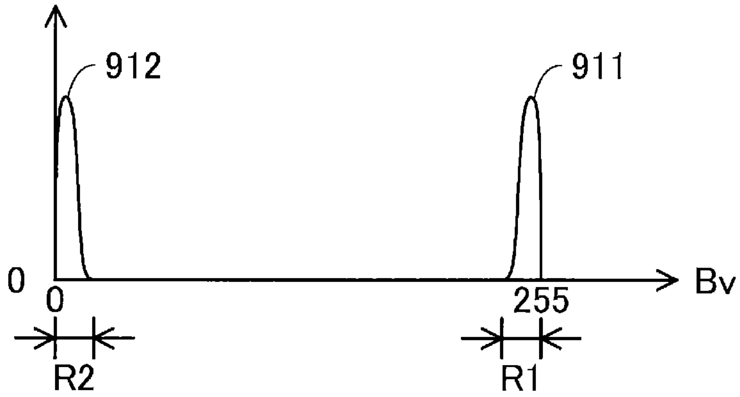
FIG. 5B is a histogram showing an example of a distribution range of color values.

FIG. 5B is a histogram showing an example of a distribution range of color values. The horizontal axis represents the luminance value By. The range of luminance values By is divided into a plurality of segments. The vertical axis represents the number of pixels in each segment of luminance values By. This histogram shows the distribution of luminance values By in the first logo image 910 (see FIG. 5A). A bright first partial color range R1 indicates the distribution range of luminance values By within the text region 911, while a dark second partial color range R2 indicates the distribution range of luminance values By within the background region 912. The processor 210 calculates the luminance values By from the RGB color values for each of the plurality of pixels to generate the histogram of luminance values By. When the histogram has a plurality of consecutive segments with one or more pixels, the processor 210 identifies the range represented by the plurality of consecutive segments as one cluster (i.e., a partial color range). In the example of FIG. 5B, the processor 210 has identified two partial color ranges R1 and R2.

Figure 5C:
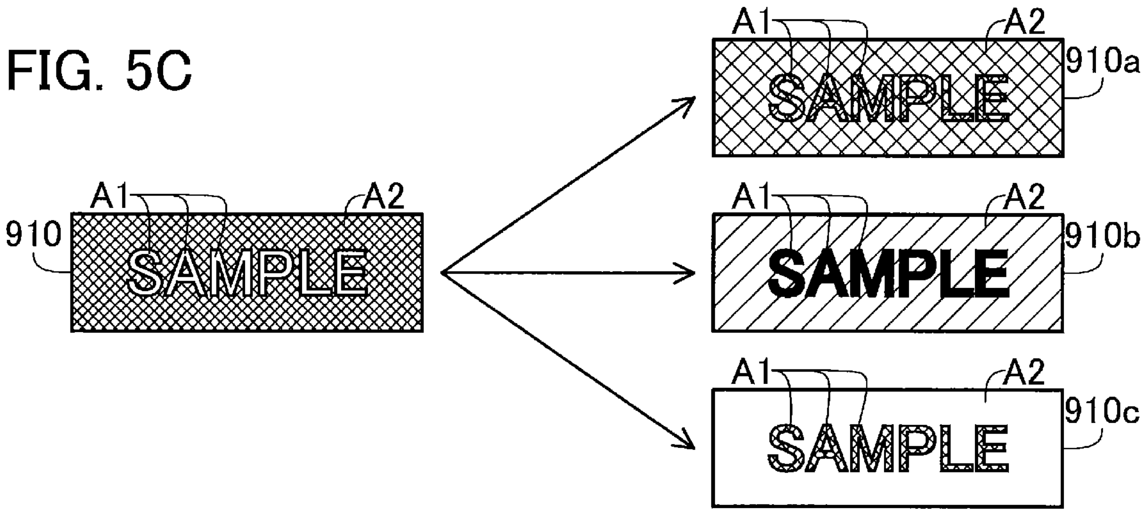
FIG. 5C is an explanatory diagram illustrating divided partial regions.

In S120 of FIG. 4 the processor 210 divides the logo image into T number of partial regions corresponding to the T number of partial color ranges. FIG. 5C is an explanatory diagram showing the divided partial regions. As shown on the left side of FIG. 5C, the first logo image 910 is divided into a first region A1 and a second region A2. The first region A1 corresponds to the first partial color range R1 and, hence, the text region 911, while the second region A2 corresponds to the second partial color range R2 and, hence, the background region 912. One partial region corresponding to one partial color range may include a plurality of discrete regions, as in the first region A1. While not shown in the drawings, the other logo images are similarly divided into a plurality of regions in S115 and S120.

Through S115 and S120, the logo image is divided into T number of partial regions, each of which is relatively homogeneous in color. The method of dividing the distribution range of color values into T number of partial color ranges may be any of various methods for associating a plurality of pixels having similar colors with a single partial color range. For example, ranges of luminance values By may be separated by luminance values By corresponding to troughs in the histogram. Alternatively, one of various color components other than the luminance value By (hue or saturation, for example) may be used to segment the distribution range of color values into T number of partial color ranges. Further, various clustering algorithms such as k-means clustering may be used. The number T of partial color ranges (i.e., the number T of partial regions) is set for each logo image. However, T may be preset instead.

In S125 the processor 210 generates K number of sets of color-modified logo image data (where K is an integer greater than or equal to one) by performing an adjustment process to randomly modify the color within one or more of the partial regions. The right side of FIG. 5C shows examples of color-modified logo images generated from the first logo image 910. This drawing shows three color-modified logo images 910*a*, 910*b*, and 910*c*. In each of the color-modified logo images 910*a*, 910*b*, and 910*c*, one or both of the colors in the first region A1 and second region A2 differ from those in the original first logo image 910. Although not shown in the drawing, the processor 210 also generates color-modified logo images from the other logo images.

In the present embodiment, the processor 210 modifies the color in one entire partial region to the same randomly set color. For example, when modifying the color in the first region A1, the color for all of the plurality of characters in the first region A1 is changed to the same color.

The modified color may be close to the pre-modified color. For example, if each of the RGB color values is expressed as a value within the range between 0 and 255, the color modification process may be configured to add a random number value within the range −100 to +100 to the color value for each component.

The processor 210 also randomly sets the total number of sets of color-modified logo image data to be generated for each logo image. However, the number of sets of color-modified logo image data to be generated may be preset for each logo image.

Figure 5D:
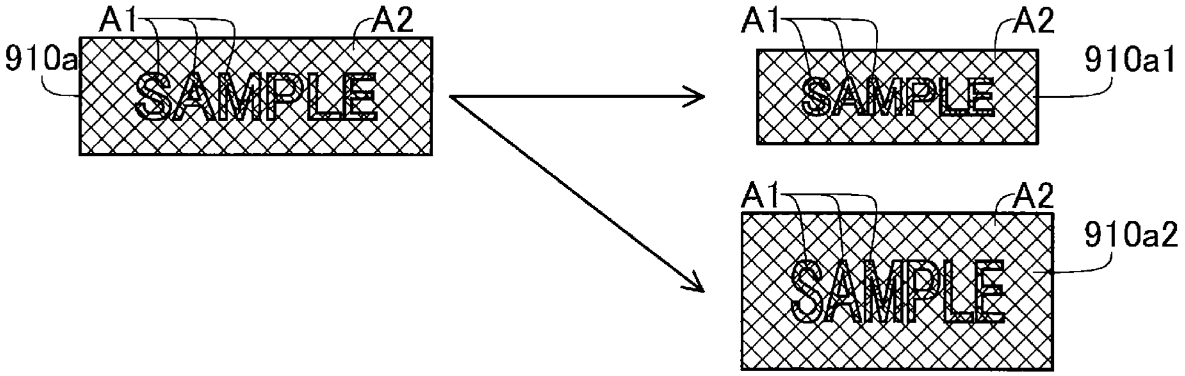
FIG. 5D is an explanatory diagram illustrating examples of color-modified logo images generated in an additional adjustment process.

In S130 the processor 210 executes an additional adjustment process on the color-modified logo image data. The additional adjustment process includes one or both of a size modification process and an aspect ratio modification process. The size modification process may be one of an enlargement process and a reduction process. FIG. 5D is an explanatory diagram showing examples of color-modified logo images generated in the additional adjustment process. This drawing shows two color-modified logo images 910*a*1 and 910*a*2 generated from the color-modified logo image 910*a*. The first color-modified logo image 910*a*1 is generated through the size modification process (a reduction process in this case). The second color-modified logo image 910*a*2 is generated through the aspect ratio modification process. Note that the processor 210 also performs the additional adjustment process on color-modified logo images generated from the other logo images. The processor 210 randomly determines whether to execute the additional adjustment process, what color-modified logo images to target in the additional adjustment process, and the content of the additional adjustment process.

In S135 the processor 210 acquires background image data. The background image data represents a background image on which the logo image is to be arranged. In the present embodiment, the processor 210 randomly acquires background image data to be processed from a plurality of sets of prepared background image data (not shown). The background image data is pre-stored in the storage device 215 (the nonvolatile storage device 230, for example; the background image data is not shown in FIG. 1). The background image data includes data representing solid background images of a single color, and data representing photographic background images. A single-color solid image is configured of a plurality of pixels having all the same color. In the present embodiment, all background images are rectangular images defined by two sides parallel to the first direction Dx and two sides parallel to the second direction Dy.

In S140 the processor 210 generates candidate image data by arranging L number of logo images over the background image (where L is an integer greater than or equal to one). The processor 210 selects the L number of logo images from among a plurality of logo images including the logo images acquired in S110, the color-modified logo images generated in S125, and the color-modified logo images generated in S130. The processor 210 randomly sets the position of each logo image on the background image. Alternatively, the processor 210 may arrange the logo images at predetermined positions on the background image. In either case, the processor 210 sets positions for logo images so that the logo images do not overlap each other. The number L of logo images is set to a value within a range from one to the maximum number of logo images that can be arranged on the background image. The processor 210 may set a random L and may randomly select L number of logo images, for example.

FIGS. 6A through 6H are schematic diagrams showing examples of candidate images. Three candidate images 800*a*, 800*b*, and 800*c* in FIGS. 6A through 6C include: corresponding background images 800*az*, 800*bz*, and 800*cz*; and four logo images arranged over each of the background images 800*az*, 800*bz*, and 800*cz*. These candidate images 800*a* through 800*c* have the following primary features. (I1) candidate image 800*a*: the background image 800*az* is a solid image of a single color. (I2) candidate image 800*b*: the background image 800*bz* is a photographic image. (I3) candidate image 800*c*: includes logo images 910 and 910*c* obtained from the first logo image 910, and logo images 920*a* and 920*b* obtained from the second logo image 920.

Figure 6A:
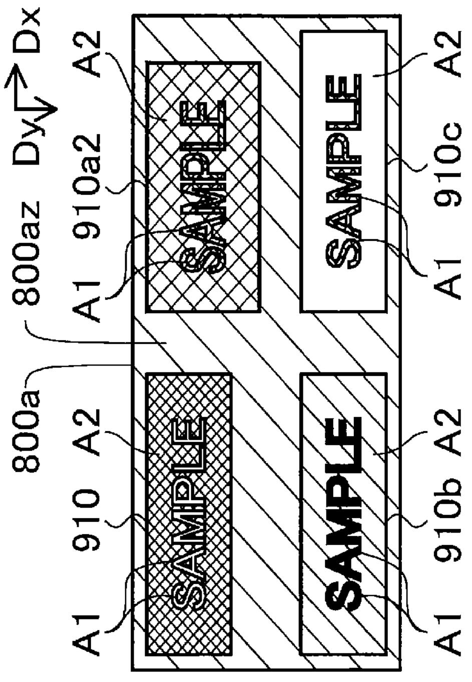
FIGS. 6A through 6H are schematic diagrams illustrating examples of candidate images.
Figure 6B:
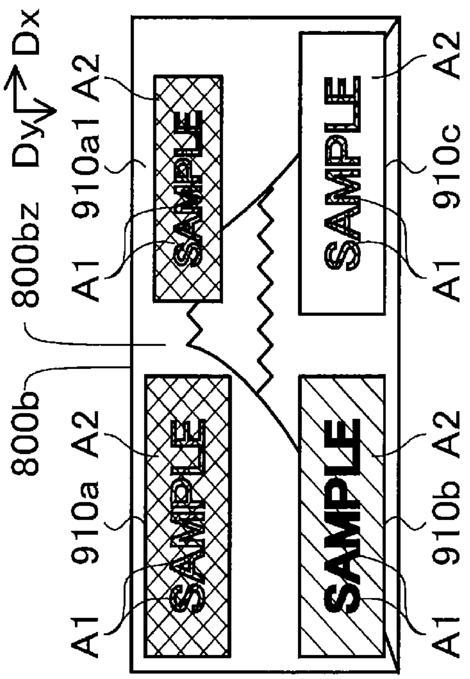
Figure 6C:
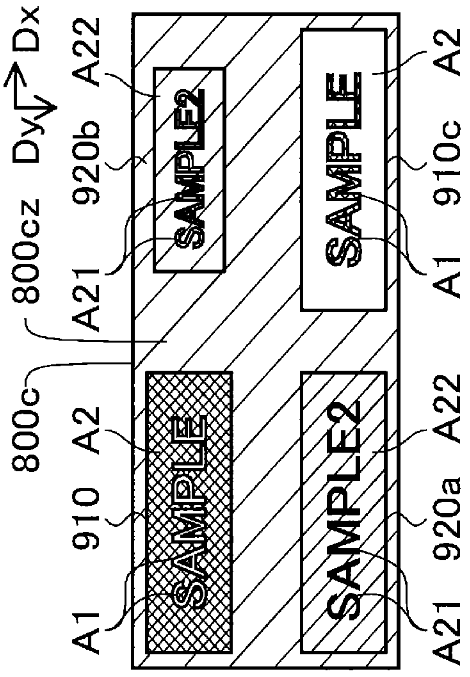
Figure 6D:
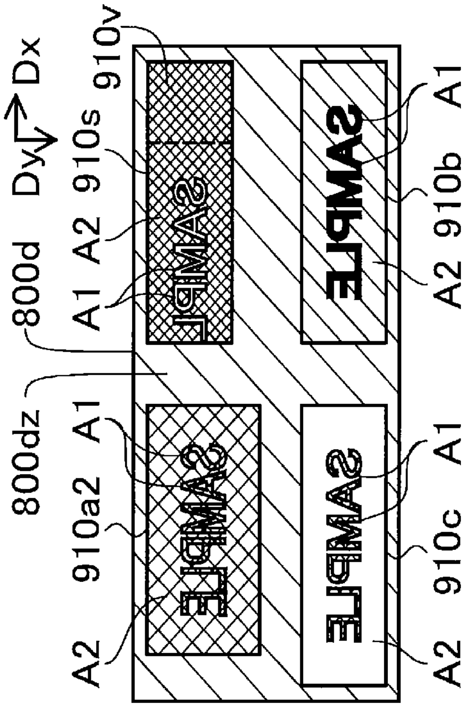
Figure 6E:
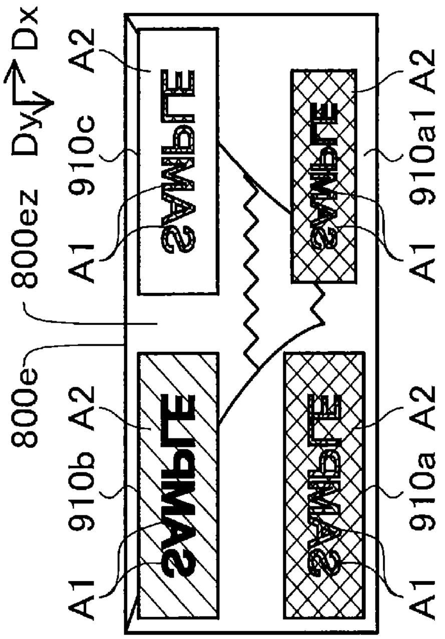
Figure 6F:
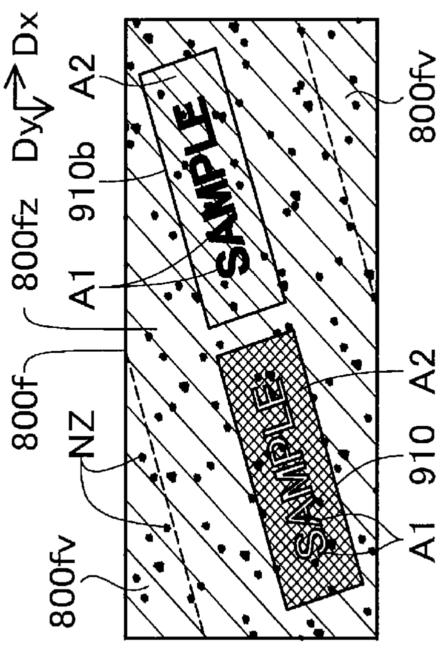
Figure 6G:
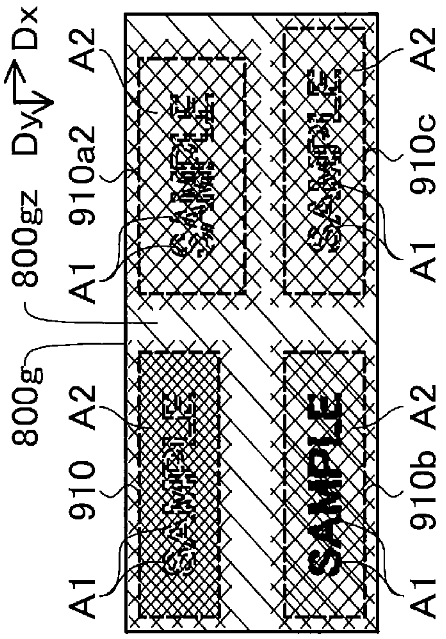
Figure 6H:
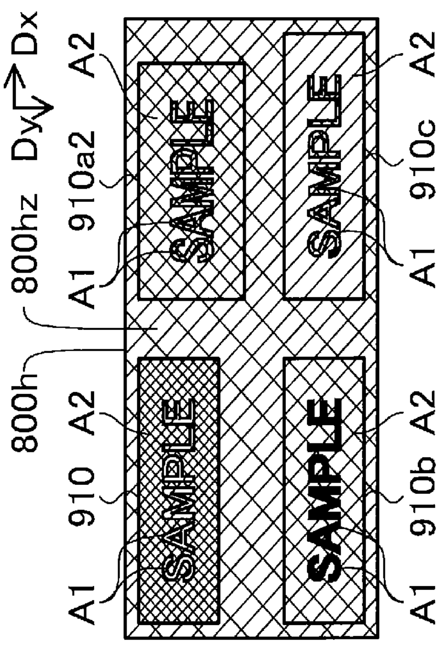

As depicted in the logo images 920*a* and 920*b* in FIG. 6C, the second logo image 920 has been divided into a first region A21 and a second region A22. The logo image 920*a* was generated by modifying the color of the second logo image 920. The logo image 920*b* was generated by modifying the color of the second logo image 920 and performing a reduction process.

In S145 of FIG. 4, the processor 210 generates new candidate image data by performing an image process on the candidate image data. This image process includes one or more processes selected from the following group of seven processes P1 through P7: (P1) a vertical flipping process to flip the candidate image about its horizontal axis; (P2) a horizontal flipping process to flip the candidate image about its vertical axis; (P3) a rotating process to rotate the candidate image; (P4) a shifting process to translate a portion of the image specified in a region of the color-modified logo image without modifying the region in the candidate image representing the color-modified logo image; (P5) a blurring process to blur the candidate image; (P6) a noise-adding process to add noise to the candidate image; and (P7) a color-adjusting process to adjust the color of the candidate image.

FIGS. 6D through 6H show five examples of candidate images 800*d* through 800*h* generated through the image process of S145. The candidate image 800*f* in FIG. 6F includes a background image 800*fz*, and the two logo images 910 and 910*b* arranged over the background image 800*fz*. The other candidate images 800*d*, 800*e*, 800*g*, and 800*h* include corresponding background images 800*dz*, 800*ez*, 800*gz*, and 800*hz*; and four logo images arranged over the corresponding background image. These candidate images 800*d* through 800*h* have the following primary features. (I4) candidate image 800*d*: the background image 800*dz* is a single-color solid image; a horizontal flipping process is performed; and a logo image 910*s* is generated through the shifting process. (I5) candidate image 800*e*: the background image 800*ez* is a photographic image; and a vertical flipping process is performed. (I6) candidate image 800*f*: a rotating process and a noise-adding process to add noise NZ are performed. (I7) candidate image 800*g*: a blurring process is performed. (I8) candidate image 800*h*: a color-adjusting process is performed.

In the present embodiment, the first direction Dx (see FIG. 6D) indicates the rightward direction. Therefore, the horizontal flipping process (FIG. 6D) swaps positions of the image along the first direction Dx about a vertical axis. Further, the second direction Dy (see FIG. 6E) indicates the downward direction. Therefore, the vertical flipping process (FIG. 6E) swaps positions of the image along the second direction Dy about a horizontal axis. In other words, the horizontal flipping process reflects the image over the line passing through the center point of a region within the image and extending in the second direction Dy, and the vertical direction reflects the image over the line passing through the center point of the region within the image and extending in the first direction Dx.

The shifting process (FIG. 6D) translates the original logo image leftward within the original region of the logo image 910*s*. Any parts of the logo image projecting outside of the original region of the logo image 910*s* after the shift are deleted. In this example, the left-side portion of the first region A1 is deleted. Further, a blank portion 910*v* generated when the original logo image is translated within the original region of the logo image 910*s* is set to the same color as the color of the second region A2 representing the background image. Note that the processor 210 randomly sets the amount and direction of movement in the shifting process.

The rotating process (FIG. 6F) rotates the original candidate image counterclockwise within the original region of the candidate image 800*f*. Any parts of the rotated candidate image projecting outside of the original region of the candidate image 800*f* are deleted. Additionally, copied portions of the background image 800*fz* are assigned to blank portions 800*fv* generated in the original region of the candidate image 800*f* when rotating the original candidate image. Note that the processor 210 randomly sets the center, direction, and angle of rotation.

The noise-adding process (FIG. 6F) selects a plurality of target pixels randomly from the plurality of pixels in the candidate image 800*f* and adds a random value to the color values for the plurality of target pixels. Any of other various processes may be performed as the noise-adding process. For example, a random value may be added to all pixels in the candidate image. Alternatively, a prepared noise image may be superimposed on the candidate image.

The blurring process (FIG. 6G) is also called a smoothing process. In the present embodiment, the blurring process is performed using a smoothing filter, and the entire candidate image 800*g* is processed. However, various processes for smoothing color values may be used as the blurring process; for example, processes using other smoothing filters such as a median filter or a Gaussian filter.

The color-adjusting process (FIG. 6H) is a gamma correction process for decreasing luminance values, and the entire candidate image 800*h* is processed. Note that any process for adjusting the color of the candidate image may be performed as the color-adjusting process; for example, a gamma correction process for increasing luminance values, a contrast enhancement process, a saturation adjustment process, or a white balance adjustment process.

Note that the processor 210 randomly sets whether to execute the image process in S145, what candidate images are to be subjected to the image process, and the content of the image process. For example, the processes to be executed may be randomly selected from among the seven processes P1 through P7.

In S150 of FIG. 4, the processor 210 randomly selects Z number of sets of first training image data D11 (where Z is an integer greater than or equal to one and is also set randomly) to be included in the first dataset DS1 (see FIG. 1) from a plurality of sets of candidate image data that includes the candidate image data generated in S140 and the candidate image data generated in S145. Next, the processor 210 generates Z number of sets of label data D12 corresponding to the Z number of sets of first training image data D11. In the present embodiment, the label data D12 determines the target values (i.e., correct solutions) of the output data 830 from the logo detection model NN1 (see FIG. 3(A)). This type of label data D12 is also called supervised data. Specifically, the label data D12 includes region information D121 specifying the region of a logo image in the candidate image, and logo class information D122 indicating a logo class specifying the type of the logo image. The region information D121 indicates the center point of a region within the candidate image (and specifically the position in the first direction Dx and position in the second direction Dy), the width of the region in the first direction Dx, and the height of the region in the second direction Dy. Logo images in the present embodiment are also categorized into C number of classes. The logo class information D122 indicates the logo class that specifies one of the C number of classes. Hereinafter, the logo class indicated by the logo class information D122 will be also called "logo class D122."

The processor 210 identifies the combination of region information D121 and logo class information D122 for each of the L number of logo images in the candidate image based on the content generated in the process of S125 through S145. The region information D121 is set so as to specify the smallest rectangle that includes the entire logo image. When the candidate image includes L number of logo images, the processor 210 generates label data D12 specifying L number of combinations of region information D121 and logo class information D122.

In S155 the processor 210 stores the first training image data D11 (see FIG. 1) and the label data D12 in association with each other in the storage device 215 (the nonvolatile storage device 230, for example). Hereinafter, the associated first training image data D11 and label data D12 will be collectively referred to as first labeled data LD1. The first dataset DS1 includes a plurality of sets of first labeled data LD1. The processor 210 may also store the first labeled data LD1 in an external storage device (not shown) connected to the information processing apparatus 200.

In S160 the processor 210 determines whether a predetermined number of sets of first training image data D11 (i.e., first labeled data LD1) has been generated. More specifically, in S160 the processor 210 determines whether a predetermined number of sets of logo images has been generated. The number of sets for each of the C number of logo images to be included in the first dataset DS1 is set to a value greater than or equal to a large reference value (1,000, for example) in order to adequately train the logo detection model NN1. If the number for any of the C number of logo images is less than the reference value (S160: NO), the processor 210 returns to S125 to generate a new set of first labeled data LD1. Once the number of sets for each of the C number of logo images is greater than or equal to the reference value (S160: YES), the processor 210 ends the process of FIG. 4. The sets of first labeled data LD1 generated in this process represent various images such as those described in FIGS. 6A through 6H. The first dataset DS1 includes such sets of first labeled data LD1. The information processing apparatus 200 is an example of the system for generating a plurality of sets of first training image data D11.

<A5. Training Process for the Logo Detection Model NN1>

Figure 7:
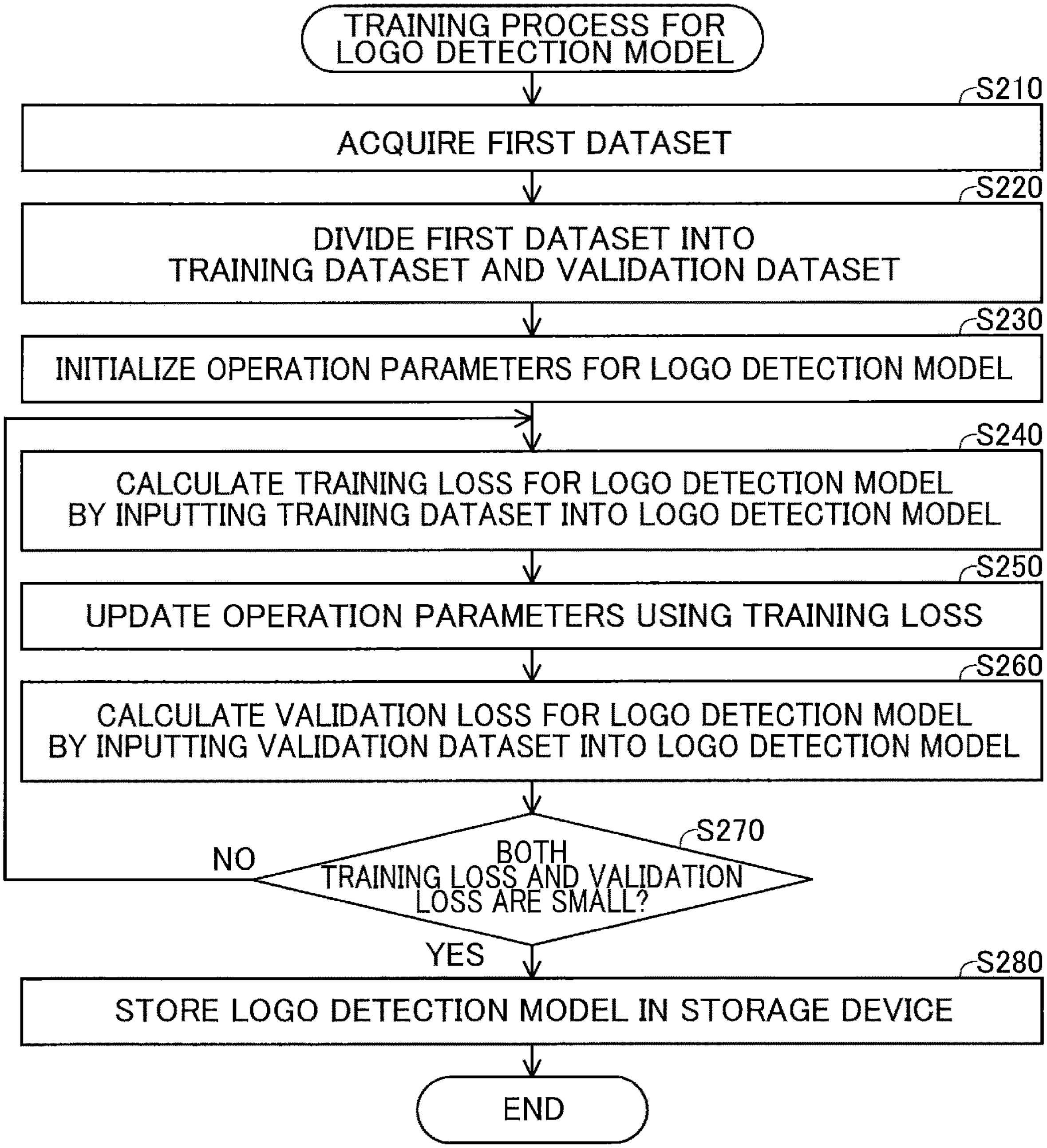
FIG. 7 is a flowchart illustrating an example of steps in a training process for training the logo detection model.

FIG. 7 is a flowchart showing an example of a training process for the logo detection model NN1 (see FIG. 3A). The logo detection model NN1 is trained so that its output data 830 indicates appropriate region information and an appropriate logo class for a logo image in the input image 800. This training adjusts the plurality of operation parameters used in operations by the logo detection model NN1 (including the plurality of operation parameters used in the operation of each of the plurality of layers CV11 through CV1*m* and CN11 through CN1*n*). The processor 210 performs the process of FIG. 7 according to the second program 232.

In S210 of FIG. 7, the processor 210 acquires the first dataset DS1 from the nonvolatile storage device 230. In S220 the processor 210 divides the plurality of sets of first labeled data LD1 in the first dataset DS1 into a training dataset and a validation dataset. For example, the processor 210 may employ 70% of the sets of first labeled data LD1 selected randomly as a training dataset and the remaining 30% of the sets of first labeled data LD1 as a validation dataset. In the following description, Nt will denote the number of sets of first labeled data LD1 used as a training dataset, and Nv will denote the number of sets of first labeled data LD1 used as a validation dataset (both Nt and Nv being integers greater than or equal to two).

In S230 the processor 210 initializes a plurality of operation parameters for the logo detection model NN1. For example, each of the operation parameters is set to a random value.

In S240 the processor 210 calculates training loss using the training dataset. Specifically, the processor 210 inputs the Nt number of sets of first training image data D11 into the logo detection model NN1 to generate Nt number of sets of output data 830. Next, the processor 210 calculates the training loss using the Nt number of sets of output data 830 and the Nt number of sets of label data D12 corresponding to the Nt number of sets of first training image data D11.

A loss function is used for calculating training loss. The loss function may be any of various functions for calculating an evaluation value for the difference between the output data 830 and the label data D12. The present embodiment uses the loss function disclosed in the above article on YOLO. This loss function includes the following five components. First, the loss function includes three components corresponding to the difference in the center, the difference in the size (i.e., width and height), and the difference in confidence related to the bounding box for specifying a region in the region information D121. The bounding box for specifying the region in the region information D121 has the highest IOU between the region in the region information D121 and the region of the bounding box among the Bn bounding boxes associated with the cell 801 that includes the center of the region information D121 (see FIG. 3B). Further, this loss function includes a component corresponding to the difference between the confidence of the bounding box and the ideal confidence (and specifically zero) for a bounding box not suitable to be associated with the region in the region information D121. The loss function also includes a component corresponding to the difference between the C number of class probabilities and the C number of correct class probabilities for the cell 801 that includes the center of the region information D121. The processor 210 calculates the training loss to be the total of the Nt number of values for loss found using the loss function. Note that training loss may be any of various values having a correlation to the Nt number of values for loss, such as the mean or median of the Nt number of values for loss.

In S250 the processor 210 uses the training loss to update the plurality of operation parameters in the logo detection model NN1. Specifically, the processor 210 adjusts the operation parameters according to a prescribed algorithm in order to reduce the training loss. The prescribed algorithm used in S250 may be an algorithm using an error backpropagation method and a gradient descent method, for example.

In S260 the processor 210 calculates validation loss using the validation dataset. The method of calculating validation loss is identical to the method of calculating training loss described in S240, except that the validation dataset is used instead of the training dataset. Specifically, the processor 210 inputs the Nv number of sets of first training image data D11 for use as a validation dataset into the logo detection model NN1 having the operation parameters updated in S250 to generate Nv number of sets of output data 830. Next, the processor 210 calculates validation loss using the Nv number of sets of output data 830 and the Nv number of sets of label data D12 associated with the Nv number of sets of first training image data D11.

In S270 the processor 210 determines whether training is complete. The condition for training to be complete may be any of various conditions. In the present embodiment, both training loss and validation loss must be less than or equal to a prescribed reference value as a condition for training to be complete. However, the condition for training to be complete may be any of various conditions indicating that both training loss and validation loss are small. For example, the reference value for training loss may differ from the reference value for validation loss.

If training is not complete (S270: NO), the 210 returns to S240 and continues the training process. Once training is complete (S270: YES), in S280 the processor 210 stores the logo detection model NN1 that includes the adjusted operation parameters in the storage device 215 (the nonvolatile storage device 230 in this case) as a trained model. Subsequently, the processor 210 ends the process of FIG. 7. The processor 210 may alternatively store the logo detection model NN1 in an external storage device (not shown) connected to the information processing apparatus 200.

The output data 830 from the trained logo detection model NN1 has the following features. The cell containing the center of a logo image can specify a bounding box that suitably indicates the region of the logo image and has a high confidence and a suitable class probability. Further, the plurality of bounding boxes specified by the output data 830 may include unsuitable bounding boxes that do not indicate the region of the logo image. Low confidences are correlated with unsuitable bounding boxes. Therefore, the logo image can be appropriately identified using a bounding box having a high confidence.

As described above, the processor 210 generates a plurality of sets of first training image data D11 in the generation process of FIG. 4 to be used for training the logo detection model NN1 to detect a logo serving as an example of the target object. Specifically, in S110 the processor 210 acquires logo image data representing logo images, which are images of logos. In S115 and S120 the processor 210 divides each logo image into T number of partial regions corresponding to T number of partial color ranges (where T is an integer greater than or equal to two) obtained by dividing the distribution range of colors in the logo image. The processor 210 executes an adjustment process that includes a color modification process to modify the colors of one or more partial regions to colors different from their original colors (S125), whereby the processor 210 generates a plurality of sets of color-modified logo image data representing a plurality of color-modified logo images. Here, each of the color-modified logo images is an image of a logo. The color-modified logo images have the same partial regions with mutually different colors. For example, the color-modified logo images 910*a* and 910*b* in FIG. 5C have the same first region A1 but in different colors. In S135 and S140 the processor 210 generates candidate image data for candidate images. Here, the candidate image data corresponds to the first training image data D11, while the candidate images correspond to the training images represented by the first training image data D11. The processor

210 executes the process from S125 to S140 a plurality of times. That is, the processor 210 generates a plurality of sets of color-modified logo image data. Next, the processor 210 generates a plurality of sets of candidate image data for a plurality of candidate images using one or more sets of background image data and the plurality of sets of color-modified logo image data. Here, a candidate image includes a background image represented by one of the one or more sets of background image data, and one or more color-modified logo images arranged over the background image (see FIGS. 6A through 6H). The plurality of candidate images includes mutually different color-modified logo images from among the plurality of generated color-modified logo images. For example, the candidate image 800*c* (see FIG. 6C) includes the color-modified logo image 910*c*, which is not included in the candidate image 800*f* (see FIG. 6F). On the other hand, the candidate image 800*f* includes the color-modified logo image 910*b*, which is not included in the candidate image 800*c*. In this way, the processor 210 can generate a plurality of sets of first training image data D11 representing logo images rendered in various colors. Such first training image data D11 can suitably train a machine learning model for processing images of logos (the logo detection model NN1, for example).

As described in S135 (FIG. 4) and shown in FIG. 6B, the one or more sets of background image data include background image data for the photographic background image 800*bz*. Hence, the processor 210 can generate a plurality of sets of first training image data D11 representing images of logos arranged over a photographic background image. Such a plurality of sets of first training image data D11 can train a machine learning model such as the logo detection model NN1 to suitably process images of logos on a photographic background image. The plurality of sets of background image data that can be used in training may include a plurality of sets of background image data representing mutually different photographs. The plurality of background images may include photographs of various subjects such as scenery, people, furniture, and stationery. Such a plurality of sets of first training image data D11 can train a machine learning model such as the logo detection model NN1 to suitable process images of logos, regardless the content in the background image.

As described in S135 (FIG. 4) and shown in FIG. 6A, the one or more sets of background image data include background image data for the background image 800*az* representing a solid image in a single color. Hence, the processor 210 can generate a plurality of sets of training image data representing images of logos on a solid background image of a single color. Such a plurality of sets of first training image data D11 can train a machine learning model such as the logo detection model NN1 to suitably process images of logos on a background image having a single solid color. The plurality of sets of background image data that can be used for training may include a plurality of sets of background image data representing solid images of mutually different colors. Such a plurality of sets of first training image data D11 can train a machine learning model such as the logo detection model NN1 to suitably process images of logos, regardless the color of the background image.

Note that it is preferable to generate a plurality of types of first training image data D11 having a plurality of types of background images with mutually different content, such as photographic background images and solid background images of a single color. Such a plurality of types of first training image data D11 can train a machine learning model such as the logo detection model NN1 to suitably process images of logos over various background images.

The processor 210 also executes an adjustment process of images that includes S125 of FIG. 4 in order to generate a plurality of sets of color-modified logo image data. In the example of FIG. 4, the adjustment process further includes S130. S130 includes one or both of a process to modify the size of a color-modified logo image and a process to modify the aspect ratio of color-modified logo image. Therefore, the processor 210 can generate first training image data D11 representing images of logos in which one or both of their size and aspect ratio have been modified. Such first training image data D11 can train a machine learning model such as the logo detection model NN1 to suitably process logo images having one or both of their size and aspect ratio modified.

In S140 (FIG. 4) and shown in FIGS. 6A through 6H, the generation process for generating the first training image data D11 includes a generation process for generating first training image data D11 for the candidate image 800*a*, which includes the background image 800*az*, and the plurality of color-modified logo images 910*b*, 910*a*2, and 910*c* arranged over the background image 800*az*. When a single set of first training image data D11 represents a plurality of color-modified logo images, the machine learning model for detecting logo images (the logo detection model NN1, for example) can be trained more efficiently than if the single set of first training image data D11 represents only a single color-modified logo image.

As described in S140 (FIG. 4) and shown in FIG. 6C, the generation process for generating first training image data D11 includes a generation process for generating first training image data D11 for a candidate image 800*c*, which includes the background image 800*cz*, at least one color-modified logo image 910*c* arranged over the background image 800*cz*, and other logo images 920*a* and 920*b* arranged over the background image 800*cz*. When a single set of first training image data D11 represents images of more than one logo, the machine learning model for detecting logo images (the logo detection model NN1, for example) can be trained more efficiently than if the single set of first training image data D11 represents only the same logo image.

As described in S140 (FIG. 4) and shown in FIG. 6A through 6H, the processor 210 arranges a plurality of logo images in a single training image so that the logo images do not overlap one another. Accordingly, the first training image data D11 can suitably train a machine learning model used to detect logo images (the logo detection model NN1, for example).

As described in S145 (FIG. 4), the generation process for generating the first training image data D11 includes a generation process to generate first training image data D11 through an image process performed on candidate image data representing candidate images that each includes a background image, and one or more color-modified logo images arranged over the background image. The image process used in this step includes one or more processes selected from the group of seven processes P1 through P7. Accordingly, the processor 210 can generate first training image data D11 representing logos that are rendered in various formats. Such first training image data D11 can train a machine learning model such as the logo detection model NN1 to suitably process logo images rendered in various formats.

<A6. Configuration of the Sheet Detection Model NN2>

Figure 8A:
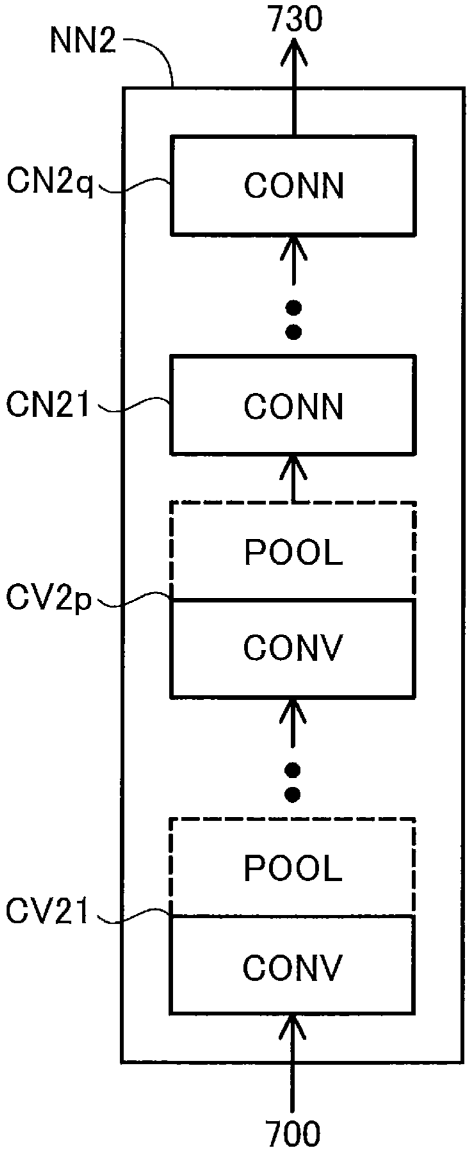
FIG. 8A is a schematic diagram illustrating an example of the configuration of a sheet detection model.

FIG. 8A is a schematic diagram showing a sample configuration of the sheet detection model NN2. In the present embodiment, the sheet detection model NN2 is a YOLO model and has the same configuration as the logo detection model NN1 (see FIG. 3A). The sheet detection model NN2 has p number of convolutional layers CV21 through CV2*p* (where p is an integer greater than or equal to one), followed by q number of fully connected layers CN21 through CN2*q* (where q is an integer greater than or equal to one). For example, p is twenty-four and q is two. A pooling layer (a layer performing max pooling, for example) is provided directly after one or more convolutional layers among the p number of convolutional layers CV21 through CV2*p*. Note that p may differ from m in FIG. 3A, and q may differ from n in FIG. 3A.

Figure 8B:
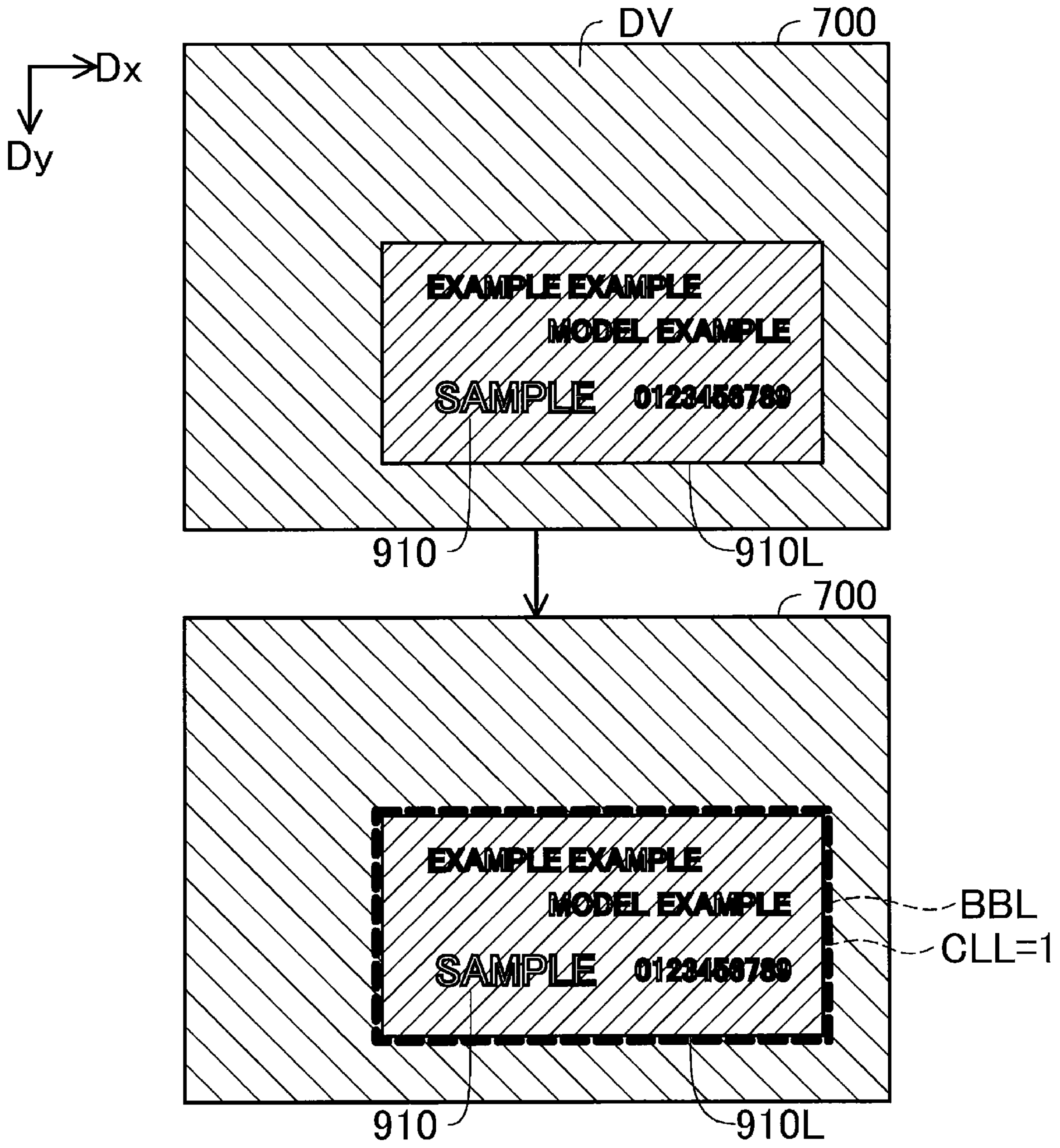
FIG. 8B is a schematic diagram illustrating an overview of operations of the sheet detection model.

FIG. 8B is an explanatory diagram showing an overview of the operation of the sheet detection model NN2. An image 700 is an example of the input image that is inputted into the sheet detection model NN2. As with the photographed images 700*x* and 700*y* in FIGS. 2A and 2B, the input image 700 is a photographed image of the printer DV. The input image 700 is represented by color values for each of a plurality of pixels arranged in a matrix configuration having a first direction Dx, and a second direction Dy orthogonal to the first direction Dx. In the present embodiment, the color values are expressed by three component values red (R), green (G), and blue (B). In the example of FIG. 8B, the input image 700 includes an image of the sheet 910L that includes the first logo image 910.

As with the logo detection model NN1 in FIGS. 3A and 3B, the sheet detection model NN2 detects regions with images of objects. Unlike the logo detection model NN1, the sheet detection model NN2 is trained to detect images of label sheets instead of logo images. C number of label sheets corresponding to the C number of logo images can be used in the present embodiment. The types of label sheets and types of logo images have a one-on-one correspondence. The sheet detection model NN2 detects images of the C number of label sheets. Hereinafter, the type of a label sheet will be called a "sheet class."

While not shown in the drawings, the sheet detection model NN2 detects bounding boxes containing images of label sheets according to the same algorithm used in the logo detection model NN1 of FIG. 3B. In the example of FIG. 8B, a bounding box BBL containing the sheet 910L is detected. A class identifier CLL is associated with the bounding box BBL. The class identifier CLL corresponds to the highest class probability among the C number of class probabilities. The class identifier "1" indicates the first sheet 910L.

The sheet detection model NN2 outputs output data 730 specifying S×S×(Bn×5+C) number of prediction values. As with the output data 830 in FIG. 3A, the output data 730 indicates a region of an object image (an image of a label sheet in this case) by a bounding box having a confidence greater than or equal to a threshold value. Further, the class identifier corresponding to the highest of the C number of class probabilities for the bounding box is adopted as the class identifier associated with the bounding box.

<A7. Annotation Process (Generation Process for Generating the Second Dataset DS2)>

Figure 9:
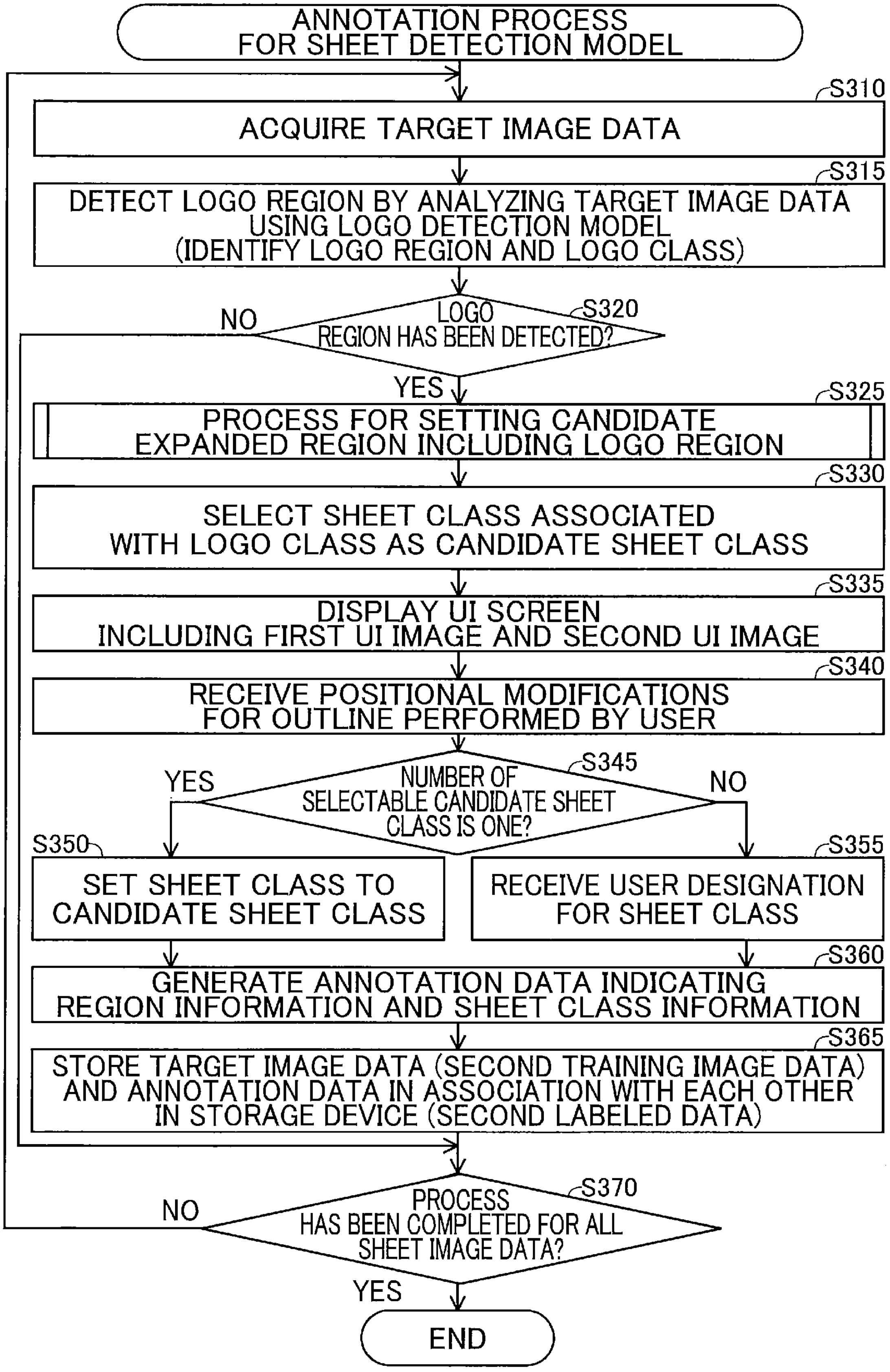
FIG. 9 is a flowchart illustrating an example of steps in a generation process for generating a second dataset for training the sheet detection model.

FIG. 9 is a flowchart showing an example of a generation process for generating the second dataset DS2 (FIG. 1) in order to train the sheet detection model NN2. The second dataset DS2 includes a plurality of sets of second labeled data LD2. Each set of second labeled data LD2 includes second training image data D21 that includes an image of a label sheet, and label data D22 associated with the second training image data D21. As with the label data D12 described in S150 and S155 of FIG. 4, the label data D22 has region information D221 specifying the region of the image containing a sheet image, and sheet class information D222 indicating a sheet class that specifies the type of the sheet image. As will be described later, the processor 210 executes a process in the process of FIG. 9 (an example of the annotation process) to associate the label data D22 specifying the region information D221 and sheet class information D222 with the second training image data D21. The sheet class indicated by the sheet class information D222 may be simply called "sheet class D222." The processor 210 executes the process in FIG. 9 according to the third program 233.

Figure 10A:
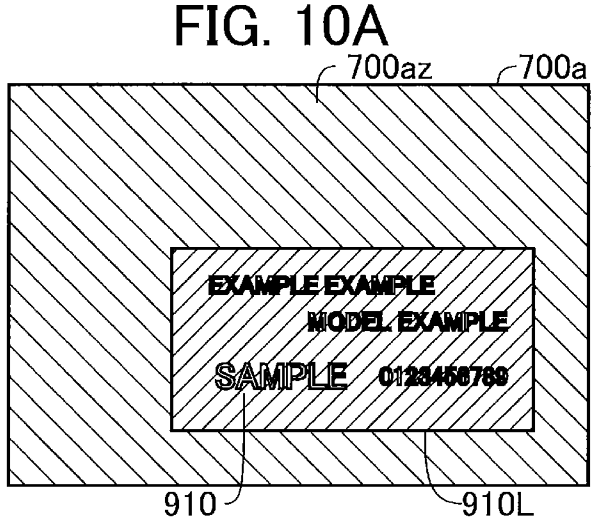
FIG. 10A is an explanatory diagram illustrating an example of a target image.

In S310 of FIG. 9, the processor 210 acquires target image data as the image data being processed. In the present embodiment, the processor 210 acquires unprocessed sheet image data from a plurality of prepared sets of sheet image data as the target image data. The plurality of sets of sheet image data is pre-stored in the storage device 215 (the nonvolatile storage device 230, for example; the sheet image data is not shown in FIG. 1). Each of the sets of sheet image data represent an image that includes a label sheet. As described above, C number of label sheets corresponding to the C number of logo images can be used in the present embodiment. The sheet image data includes C number of sets of sheet image data representing C number of label sheets. FIG. 10A is an explanatory diagram showing an example of a target image 700*a*. The target image 700*a* in FIG. 10A includes a region with an image of the first sheet 910L, and a background region 700*az*. The image of the first sheet 910L includes the first logo image 910.

In the present embodiment, sheet image data is generated by arranging an image of the sheet over the background image represented by the background image data. The background image denotes a solid image of a single color. In the actual photographed image of the printer, the background region represents the outer surface of the printer. In the present embodiment, the outer surface of the printer DV has the same color at any position. Therefore, the image of the background region in the actual photographed image is an image of a substantially single solid color. Note that the background image is not limited to an image of a single solid color but may be one of various other images such as a photographed image of the outer surface of the printer. Further, the sets of sheet image data may be generated using a digital camera to photograph a printer having a label sheet.

Figure 10B:
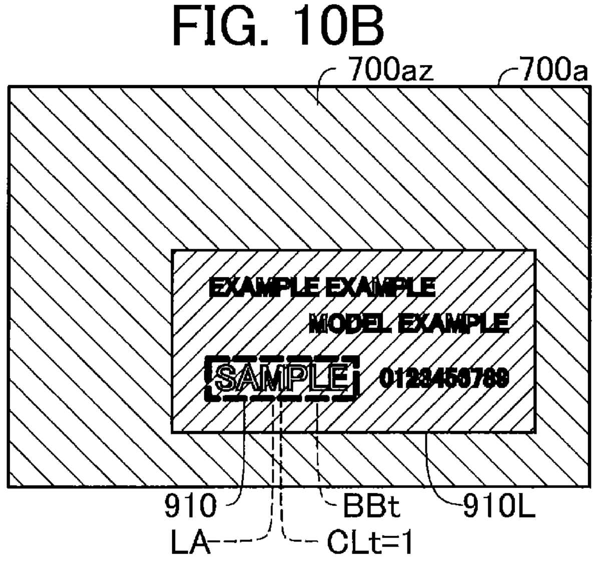
FIG. 10B is an explanatory diagram illustrating an example of a logo region.

In S315 of FIG. 9, the processor 210 identifies the logo region by analyzing the target image data using the logo detection model NN1 (see FIG. 3A). Specifically, the processor 210 input the target image data into the logo detection model NN1 to generate the output data 830. Subsequently, the processor 210 sets the logo region to a rectangular region enclosing the bounding box specified by the output data 830 (and specifically a bounding box having a confidence greater than or equal to the preset threshold value). FIG. 10B is an explanatory diagram showing an example of the logo region. A bounding box BBt indicates the first logo image 910 in the target image 700*a*. The processor 210 identifies the region surrounded by the bounding box BBt as a logo region LA. The processor 210 also identifies the class identifier associated with the highest of the C number of class probabilities associated with the bounding box BBt as a logo class CLt specifying the type of the logo region LA (CLt=1 in the example of FIG. 10B).

In S320 of FIG. 9, the processor 210 determines whether a logo region is detected. When a logo region is detected (S320: YES), in S325 the processor 210 sets an expanded region that includes the logo region (process for setting a candidate expanded region including a logo region).

Figure 10C:
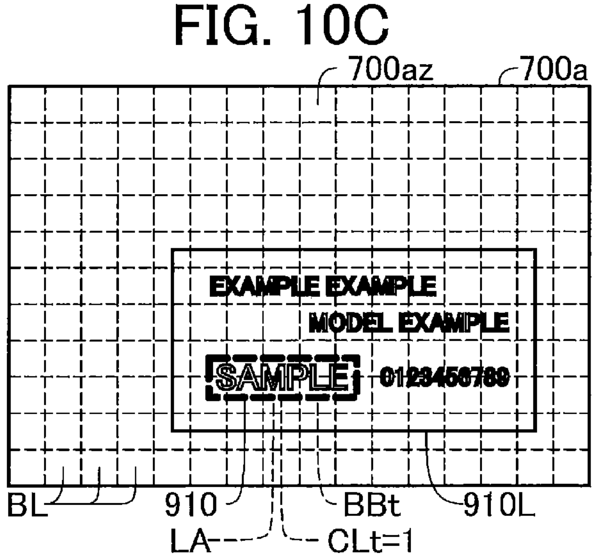
FIG. 10C is an explanatory diagram illustrating an example of a plurality of blocks.
Figure 11:
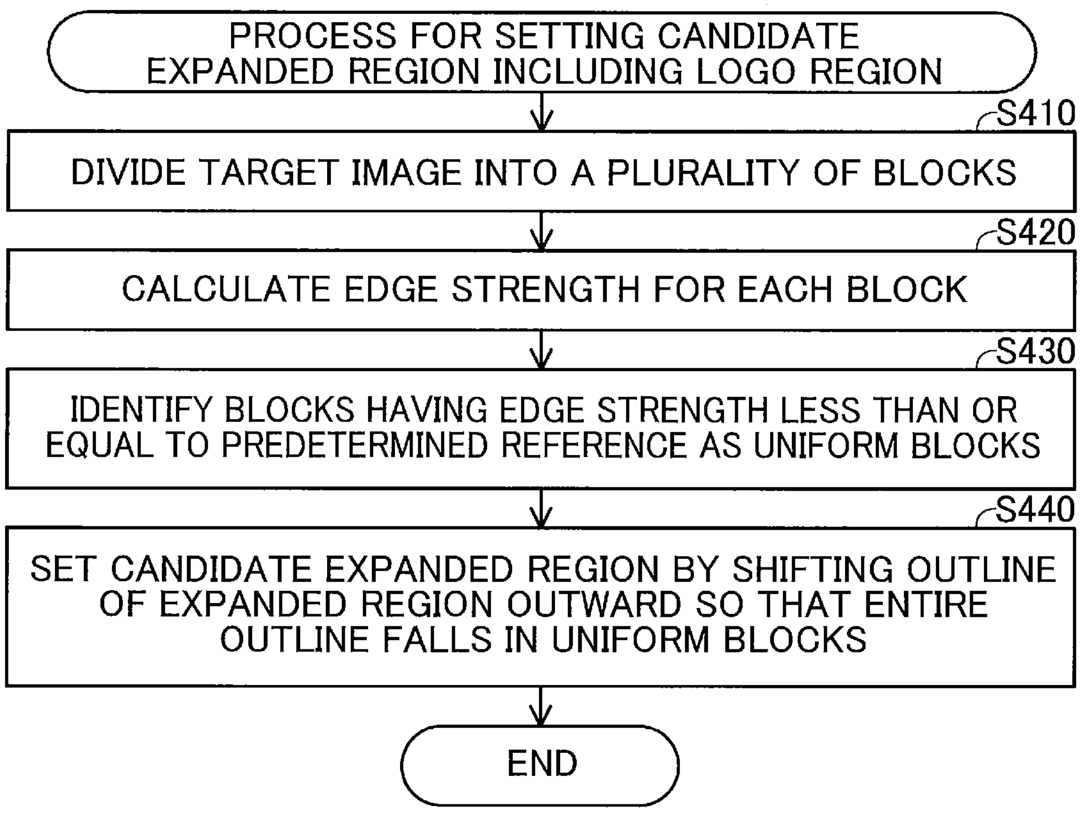
FIG. 11 is a flowchart illustrating an example of a process for setting a candidate expanded region including a logo region.

FIG. 11 is a flowchart showing an example of the process for setting a candidate expanded region including the logo region. In S410 the processor 210 divides the target image into a plurality of blocks. FIG. 10C is an explanatory diagram showing an example of these blocks. The target image 700*a* is divided into a plurality of blocks BL having a predetermined shape. The layout of the blocks BL in the target image 700*a* is predetermined.

In S420 of FIG. 11, the processor 210 calculates an edge strength for each of the blocks BL. The edge strength is an evaluation value for the ratio of change in color to change in position within the target image. In the present embodiment, the processor 210 calculates an edge amount for each pixel using a Laplacian filter (for example, the absolute value of computational results with the filter). A predetermined color component (the luminance value, for example) is used for calculating the edge amount. Next, the processor 210 calculates the edge strength of the block BL to be the average value of edge amounts for all pixels in the block BL. Note that other various methods may be used to calculate the edge strength. For example, another filter such as a Sobel filter or a Prewitt filter, may be used in place of the Laplacian filter to calculate the edge amounts. Further, rather than taking the average of the edge amounts for the plurality of pixels, various other values correlated with edge amounts for the plurality of pixels such as the median or mode may be used to calculate the edge strength of the block BL.

In S430 the processor 210 identifies blocks BL having an edge strength less than or equal to a predetermined reference value as uniform blocks. Hereinafter, blocks BL other than uniform blocks will be called nonuniform blocks.

Figure 10D:
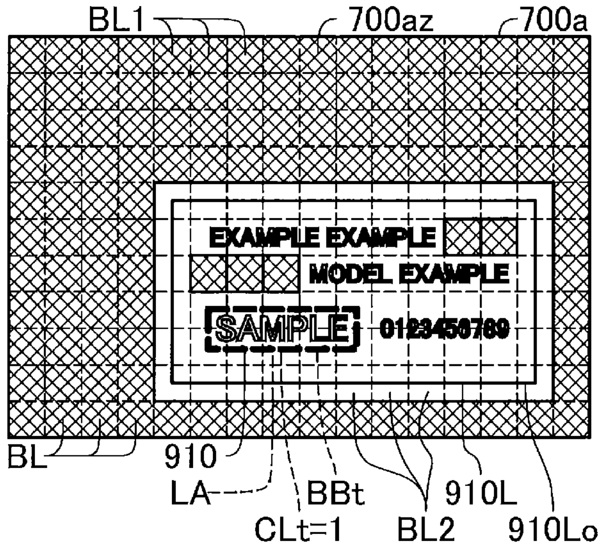
FIG. 10D is an explanatory diagram illustrating an example of uniform blocks.

FIG. 10D is an explanatory diagram showing an example of uniform blocks. Of the blocks BL in the target image 700*a*, the shaded blocks BL are uniform blocks BL1, and the nonshaded blocks BL are nonuniform blocks BL2. As shown in the drawing, the blocks BL in the background region 700*az* outside of the first sheet 910L are uniform blocks BL1. Many of the blocks BL representing the first sheet 910L are nonuniform blocks BL2. However, some of the blocks BL representing first the sheet 910L are uniform blocks BL1. Generally, a label sheet can include elements in addition to the logo image, such as text, graphics, marks, and symbols. Therefore, the percentage of uniform blocks BL1 among the blocks BL representing the label sheet 910L is low. Further, pixels representing an outline 910Lo of the label sheet 910L have large edge amounts. Therefore, blocks BL representing the outline 910Lo of the label sheet 910L are likely to be nonuniform blocks BL2.

Figure 10E:
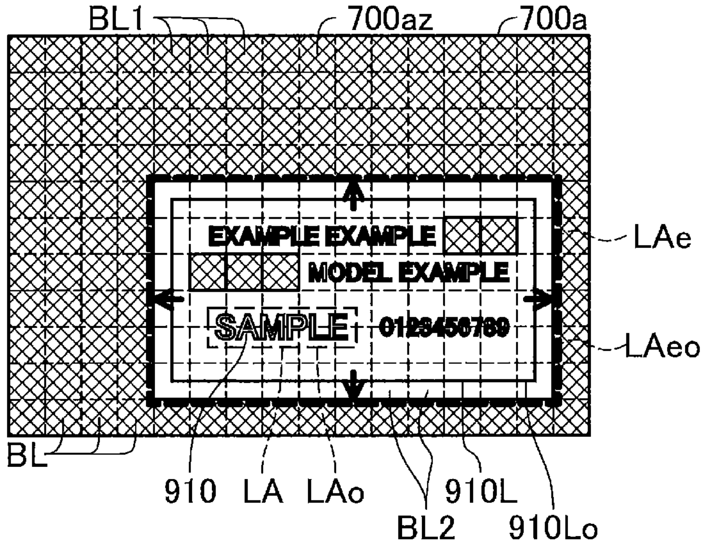
FIG. 10E is an explanatory diagram illustrating an example of a candidate expanded region.

In S440 of FIG. 11, the processor 210 adopts the region corresponding to the logo region as the initial region for the expanded region. Next, the processor 210 sets a candidate for the expanded region including the logo region by moving the outline of the expanded region outside the logo region. The processor 210 moves the outline so that the entire outline falls in uniform blocks BL1. FIG. 10E is an explanatory diagram showing an example of a candidate for the expanded region. A candidate expanded region LAe in the target image 700*a* includes the logo region LA, and a portion outside the logo region LA. An outline LAeo of the candidate expanded region LAe falls entirely in uniform blocks BL1. As described above, blocks BL representing the outline 910Lo of the label sheet 910L are likely to be nonuniform blocks BL2. Therefore, the processor 210 can set a candidate expanded region LAe having an outline LAeo that surrounds the outline 910Lo of the label sheet 910L. This candidate expanded region LAe will include the entirety of the label sheet 910L.

Various processes may be used to shift (move) the outline. In the present embodiment, an outline LAo of the logo region LA is configured of four sides forming a rectangle (i.e., a top side, a bottom side, a left side, and a right side). The processor 210 repeatedly performs a process to shift all four sides outward a prescribed amount at a time until all four sides are included in uniform blocks BL1. Through this process, the processor 210 can set a candidate expanded region LAe that is smaller than the target image 700*a* but includes the entirety of the label sheet 910L.

After completing the process in S440, the processor 210 ends the process of FIG. 11 and, hence, S325 of FIG. 9.

In S330 the processor 210 selects candidate sheet class information representing a candidate for sheet class information from among the C number of sets of sheet class information based on the logo class identified in S315. If the logo class identified in S315 corresponds to one of the two logo images 910 and 920, the processor 210 in the present embodiment adopts both sets of sheet class information corresponding to the two logo images 910 and 920 as candidates. The C number of logo images available in the present embodiment also include a third logo image (not shown). When the logo image identified in S315 corresponds to the third logo image, the processor 210 adopts the single set of sheet class information corresponding to the third logo image as a candidate. Correlations between logo classes identified in S315 and candidate sheet class information are preset. Thus, by referencing the logo class identified in S315, the processor 210 can adopt sheet class information that could be suitable as candidate sheet class information. The processor 210 selects the candidate associated with the logo class.

Figure 12A:
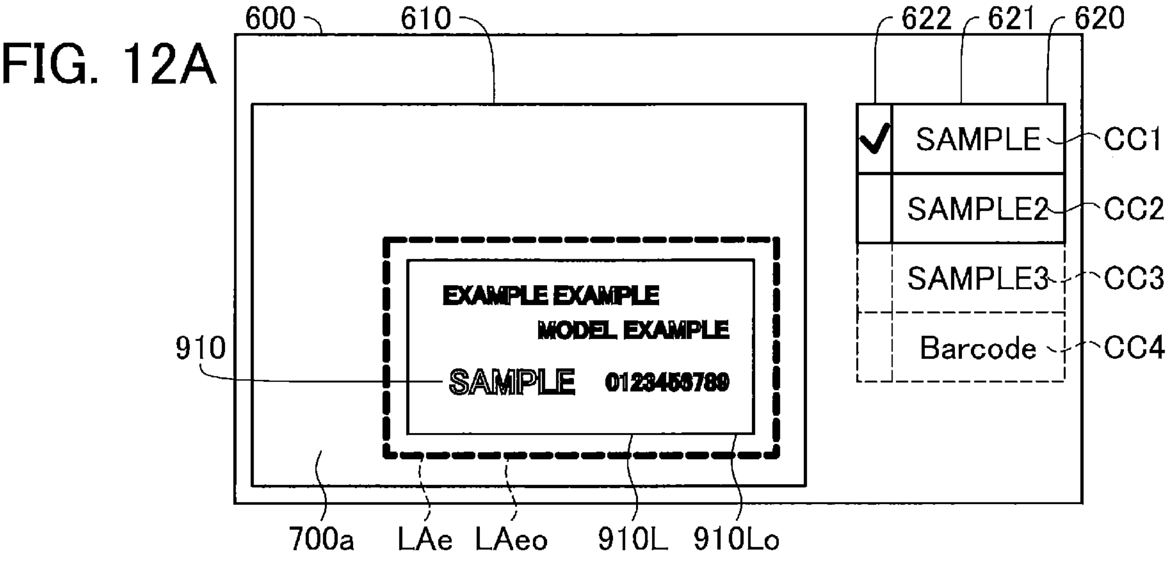
FIG. 12A is an explanatory diagram illustrating an example of a user interface screen.

In S335 the processor 210 displays a user interface screen (hereinafter abbreviated as "UI screen") on the display unit 240 (see FIG. 1). FIG. 12A is an explanatory diagram showing an example of a UI screen 600. This UI screen 600 includes a first user interface image (abbreviated in FIG. 9 as "first UI image") 610, and a second user interface image (also abbreviated in FIG. 9 as "second UI image") 620. This example of the UI screen 600 shows a case in which two or more sets of candidate sheet class information have been selected in S330 of FIG. 9.

The first user interface image 610 allows the user to modify the position for the outline LAeo of the candidate expanded region LAe. The first user interface image 610 shows the target image 700*a* that includes the first sheet 910L and the outline LAeo of the candidate expanded region LAe. By operating the operating unit 250 (see FIG. 1), the user can move (shift) the outline LAeo.

The second user interface image 620 allows the user to identify sheet class information indicating a sheet class that specifies the type of the candidate expanded region LAe, i.e., the type of the label sheet. The second user interface image 620 includes a candidate region 621 specifying one or more candidates of sheet class information that the user can select, and checkboxes 622 for indicating a single candidate selected from the one or more candidates. The checkboxes 622 depicted with solid lines denote selectable candidates, while checkboxes 622 with dashed lines denote nonselectable candidates. The selectable candidates are the candidates that were selected in S330.

In the example of FIG. 12A, the checkboxes 622 show four sets of sheet class information CC1, CC2, CC3, and CC4. The first sheet class information CC1 corresponds to the first logo image 910 (FIG. 3B). The second sheet class information CC2 corresponds to the second logo image 920 (FIG. 3B). The third sheet class information CC3 corresponds to the third logo image (not shown in FIG. 3B). The fourth sheet class information CC4 specifies a barcode. In this example, the two sets of sheet class information CC1 and CC2 are selectable, while the other sets of sheet class information CC3 and CC4 are nonselectable. By operating the operating unit 250, the user can insert a check into (i.e., select) one of the selectable candidates. Note that in S335 of FIG. 9, the processor 210 sets the sheet class information corresponding to the logo class identified in S315 as default sheet class information. The processor 210 then displays the second user interface image 620 with the default sheet class information selected.

Figure 12B:
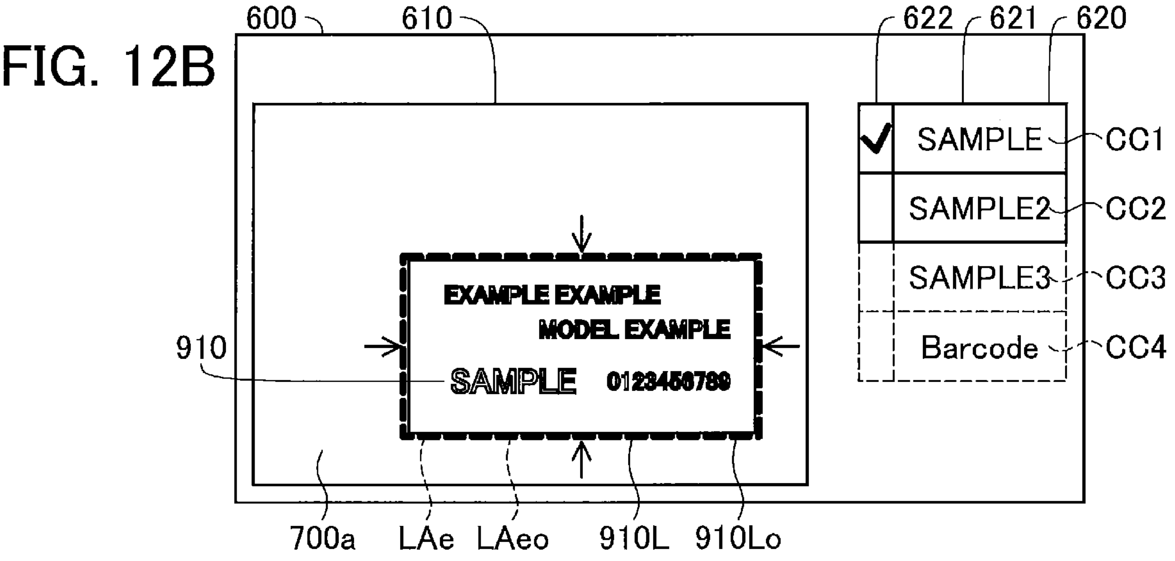
FIG. 12B is an explanatory diagram illustrating an example of a modified outline displayed on the user interface screen of FIG. 12A.
Figure 12C:
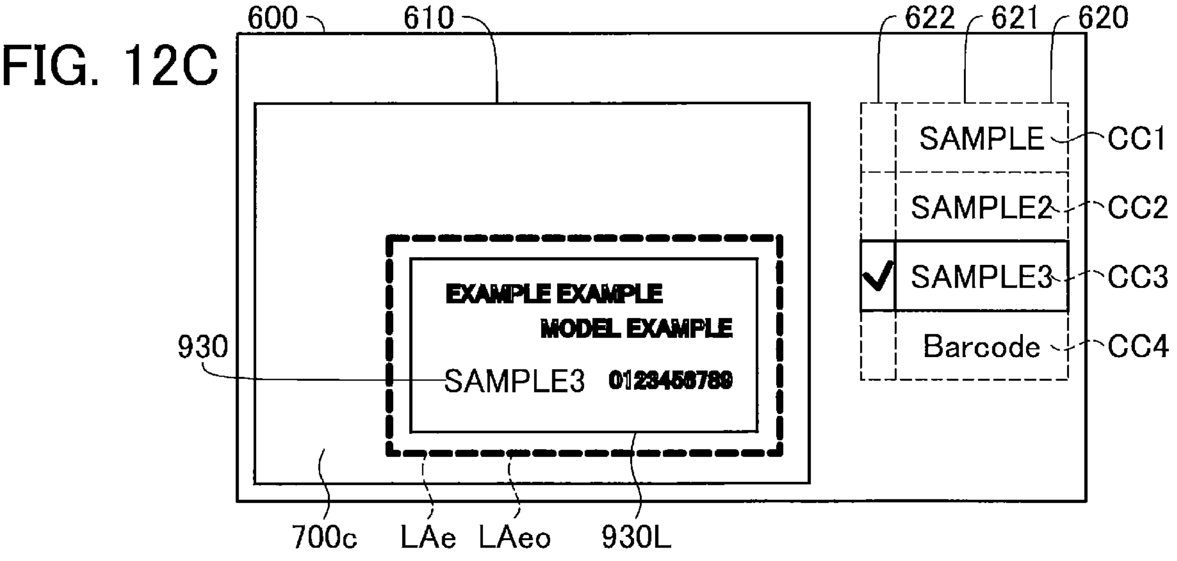
FIG. 12C shows another example of the user interface screen.

FIG. 12C shows an example of a UI screen when only one set of candidate sheet class information is selected in S330 of FIG. 9. The first user interface image 610 shows a target image 700*c* that includes an image of a label sheet 930L. The label sheet 930L includes a third logo image 930. In the second user interface image 620, the third sheet class information CC3 is selectable while the other sheet class information CC1, CC2, and CC4 are nonselectable.

Note that nonselectable candidates need not be displayed in the second user interface image 620.

In S340 of FIG. 9, the processor 210 receives positional modifications for the outline LAeo performed by the user. FIG. 12B is an explanatory diagram showing an example of a modified outline LAeo. In the example of FIG. 12B, the user has adjusted the four sides of the outline LAeo toward the outline 910Lo of the sheet 910L. Through this adjustment, the candidate expanded region LAe can suitably depict the region of the sheet 910L. If the user has modified the position of the outline LAeo, the processor 210 sets a region having an outline at the modified position as the final expanded region. Note that the user can also operate the operating unit 250 to input a command for accepting the unmodified position of the outline LAeo. In this case, the processor 210 sets the final expanded region to the candidate expanded region LAe that has initially been set in S325.

In S345 of FIG. 9, the processor 210 determines whether the number of selectable candidates for the sheet class information is one. If the number of selectable candidates is greater than one (S345: NO), in S355 the processor 210 receives a user designation for the sheet class information. In the examples of FIGS. 12A and 12B, the user can operate the operating unit 250 to select one of the two sets of sheet class information CC1 and CC2. The logo class identified in S315 of FIG. 9 could be incorrect, for example. That is, the default sheet class information adopted in S335 may be incorrect. By viewing the label sheet displayed in the first user interface image 610, the user can confirm what sheet class information is suitable. Then by operating the operating unit 250, the user can designate the suitable sheet class information. If the default sheet class information is correct, the user may operate the operating unit 250 to input a command accepting the default sheet class information. After completing the process of S355, the processor 210 advances to S360 described later.

However, if only one candidate for sheet class information is selectable (S345: YES), in S350 the processor 210 sets the sheet class information to the candidate sheet class identified in S330. Subsequently, the processor 210 advances to S360.

In S360 the processor 210 generates annotation data indicating annotation information that includes the region information specifying the candidate expanded region LAe, and the sheet class information set in S350 or S355. In S365 the processor 210 stores the target image data and annotation data in association with each other in the storage device 215 (the nonvolatile storage device 230, for example). The associated target image data and annotation data collectively form the second labeled data LD2 (FIG. 1). The target image data corresponds to the second training image data D21, and the annotation data corresponds to the label data D22. Note that the processor 210 may store the second labeled data LD2 in an external storage device (not shown) connected to the information processing apparatus 200.

After completing the process in S365, the processor 210 advances to S370. Further, if the processor 210 determines in S320 that a logo region is not detected in S315 (S320: NO), the processor 210 skips the process in S325 through S365 and advances to S370. In S370 the processor 210 determines whether the process has been completed for all sheet image data. If any unprocessed sheet image data remains (S370: NO), the processor 210 returns to S310 and repeats the above process on new target image data. After the process has been completed for all sheet image data (S370: YES), the processor 210 ends the process in FIG. 9. Through this process, the processor 210 generates the second dataset DS2. The information processing apparatus 200 is an example of the system that associates label data D22 with second training image data D21.

<A8. Training Process for the Sheet Detection Model NN2>

Figure 13:
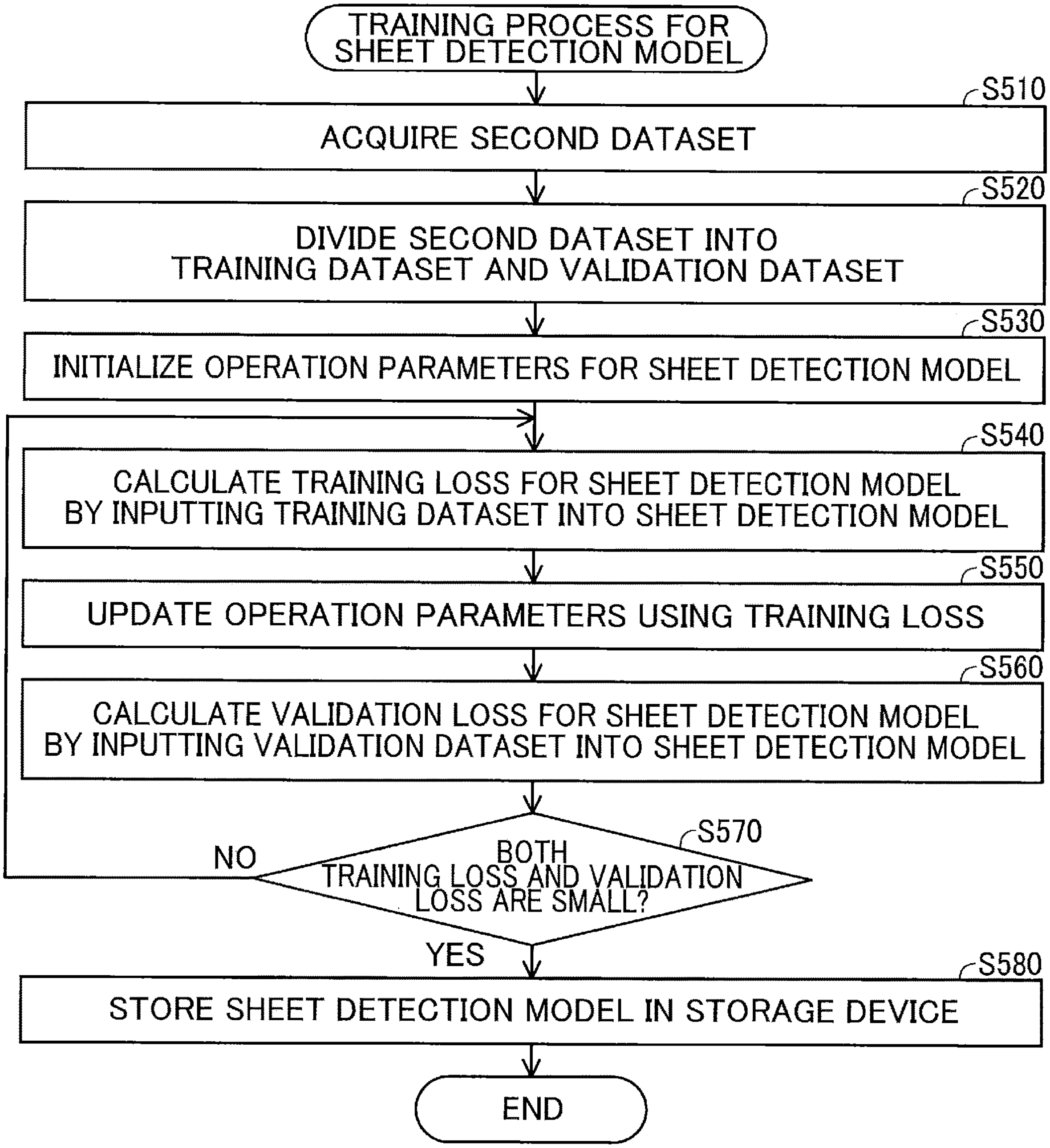
FIG. 13 is a flowchart illustrating an example of a training process for training the sheet detection model.

FIG. 13 is a flowchart showing an example of a training process for training the sheet detection model NN2 (see FIG. 8A). The sheet detection model NN2 is trained so that the output data 730 indicates suitable region information and suitable sheet class information for an image of a label sheet in the input image 700. This training adjusts the plurality of operation parameters used for operations in the sheet detection model NN2 (including the plurality of operation parameters used in each operation of the layers CV21 through CV2*p* and CN21 through CN2*q*). The processor 210 performs the process of FIG. 13 according to the fourth program 234.

The training process of FIG. 13 is identical to the training process of FIG. 7, except that the sheet detection model NN2 is the model subjected to training and the second dataset DS2 is the dataset used for training. Thus, S510 through S580 of FIG. 13 are identical to S210 through S280 of FIG. 7, and a detailed description of these steps has been omitted. Once the sheet detection model NN2 is trained, the output data 730 outputted from the sheet detection model NN2 can specify a bounding box that suitably indicates the region containing an image of the label sheet and that has a high confidence and an appropriate class probability. Note that while the processor 210 stores the sheet detection model NN2 in the storage device 215 in S580, the processor 210 may instead store the sheet detection model NN2 in an external storage device (not shown) connected to the information processing apparatus 200.

Once trained, the sheet detection model NN2 (see FIG. 8A) can be used for inspecting printers. The processor 210 inputs photographic image data of a printer (the photographed images described in FIGS. 2A and 2B, for example) into the sheet detection model NN2. The sheet detection model NN2 outputs the output data 730 that specifies the region containing the label sheet detected based on the photographed image. When a label sheet is detected, the inspection result for the printer is "pass." When a label sheet is not detected, the inspection result is "fail."

In FIG. 9 described above, the processor 210 executes a process for associating information with the second training image data D21, which is used for training the sheet detection model NN2. The sheet detection model NN2 is an example of the machine learning model. More specifically, in S310 the processor 210 acquires target image data (i.e., the second training image data D21) for a target image (the target image 700*a* shown in FIG. 10A, for example), which is the image being processed. In S315 the processor 210 analyzes the target image data to detect a logo region (the logo region LA, for example) in the target image. The logo region specifies an image of the logo, which is an example of the target object. In S325 and S340, the processor 210 sets a candidate expanded region LAe that includes the logo region and a portion outside the logo region. In S360 and S365, the processor 210 generates and stores annotation data specifying annotation information that includes region information specifying the candidate expanded region LAe (i.e., the label data D22) in the storage device 215 in association with the target image data. In this way, the processor 210 can associate region information specifying the candidate expanded region LAe that includes the logo region LA containing the logo and an additional region with the second training image data D21. As described in the examples of FIGS. 12A and 12B, the processor 210 can associate the region information D221 specifying a region containing the sheet 910L, which includes a logo image (first logo image) 910 and other images, with the second training image data D21. This region information D221 is suitable for training a machine learning model (the sheet detection model NN2, for example) to process a region including another region in addition to the region specifying the logo (a region containing the label sheet, for example).

As described in S310 of FIG. 9 and FIG. 10A, the image of the target object is the logo image. Therefore, the processor 210 can associate the region information D221, which specifies an expanded region that includes the region containing the logo image and another region, with the second training image data D21.

As shown in FIG. 10B, the region detected in S315 of FIG. 9 is a rectangular region. The model used for detecting a rectangular region representing an image of the target object (the logo image, for example) is not limited to YOLO, but may be any of various object detection models, such as a Single Shot MultiBox Detector (SSD) or a Region-Based Convolutional Neural Network (R-CNN), for example. Hence, the processor 210 can appropriately detect the region.

The process for setting the expanded region includes step S325 of FIG. 9. Step S325 (i.e., the process of FIG. 11) includes a process for analyzing the target image data to expand the expanded region from a region equivalent to the logo region LA to a region outside the logo region LA, as described in FIG. 10E and the like. In the present embodiment, the processor 210 performs this process. This process also sets a candidate expanded region LAe. Since the processor 210 (i.e., the information processing apparatus 200) expands the candidate expanded region LAe, the information processing apparatus 200 can reduce the user's burden.

Step S325 (i.e., the process of FIG. 11) also includes the process in S410 through S430 and the process in S440. As described in FIG. 10D and the like, in the process of S410 through S430 the processor 210 analyzes the target image data to identify blocks BL having an edge strength equal to or smaller than a reference as uniform blocks BL1. The edge strength is an evaluation value for the ratio of change in color to change in position in the target image. Thus, the condition for selecting blocks BL as uniform blocks BL1 (called the "uniformity condition") is for the edge strength to be less than or equal to the reference. Further, as described in FIG. 10E and the like, in S440 the processor 210 expands the expanded region toward the outside of the logo region LA so that the entire outline LAeo of the candidate expanded region LAe is included in uniform blocks BL1. In this way, the processor 210 can appropriately expand the candidate expanded region LAe using uniform blocks BL1. For example, the candidate expanded region LAe can be expanded to the border between the background region and a region of a large object (the sheet 910L, for example) that includes the target object (the first logo image 910 in this case) and other elements. A candidate expanded region LAe expanded in this way is suitable for training a machine learning model (the sheet detection model NN2, for example) to process the region of a large object that includes a region containing a logo and another region.

The process for setting the candidate expanded region LAe also includes steps S335 and S340 of FIG. 9. As described in FIGS. 12A, 12B, and the like, in S335 the processor 210 displays the first user interface image 610 on the display unit 240, allowing the user to modify the position for the outline LAeo of the candidate expanded region LAe. In S340 the processor 210 sets the expanded region to the region having the outline at the user-modified position. Hence, the processor 210 can suitably set the expanded region based on an outline adjusted by the user.

Further, when step S355 of FIG. 9 is to be executed, in S335 the processor 210 displays the second user interface image 620 on the display unit 240, prompting the user to identify sheet class information representing the type of the candidate expanded region LAe (i.e., the type of the label sheet), as described in FIG. 12A and the like. In S360 and S365, the processor 210 stores annotation data specifying annotation information, which includes the sheet class information identified by the user, in the storage device 215 in association with the target image data. Therefore, the processor 210 can associate suitable sheet class information with the target image data.

As described in FIGS. 12A, 12C, and the like, the second user interface image 620 includes the candidate region 621 that indicates one or more candidates for sheet class information that the user can select from among the C number of sets of preset sheet class information. As described in S330, the one or more candidates displayed in the candidate region 621 denote the sheet class information that has been associated with the logo in the logo region detected in S315. For example, when the first logo image 910 (see FIG. 12A) was detected, the sheet class information CC1 and CC2 correlated with the first logo image 910 are candidates. Hence, the user can easily select suitable sheet class information.

In S350 of FIG. 9, the processor 210 sets the sheet class information for inclusion in the annotation information to the candidate sheet class information among the preset C number of sets of sheet class information that has been correlated with the logo in the logo region detected in S315. For example, when the third logo image 930 (see FIG. 12C) is detected, in S330 the processor 210 selects the third sheet class information CC3 correlated with the third logo image 930 as the candidate. In S350 the processor 210 sets the sheet class information to be included in the annotation information to the third sheet class information CC3. In S360 and S365, the processor 210 stores annotation data specifying annotation information, which includes the sheet class information set in S350, in the storage device 215 in association with the target image data. Hence, the processor 210 can associate suitable sheet class information with the target image data.

B. Variations of the Embodiment (1) Various other processes may be employed in place of the process in FIG. 4 to generate training image data for training an object detection model. For example, the process for dividing a logo image into T number of partial regions (S115 through S120) may be a process for dividing the logo image according to a preset region pattern (for example, a region pattern specifying the first region A1 and second region A2) without analyzing the distribution of colors in the logo image data.

The colors modified in S125 may be any of various colors, such as predetermined colors that are different from the original colors. Further, when the colors of the logo image are expressed as halftones, the modified colors may be colors rendered in different halftones from the original halftones (for example, the number of lines may differ from the original number of lines).

The background images available in S135 through S140 may be of various types, such as graphics and patterns, and are not limited to single-color solid images and photos. Further, one or both of the photos and single-color solid images may be omitted from the available background images.

One of the size modification process and aspect ratio modification process may be omitted from S130, or the entire step S130 may be omitted.

In one or more of the processes in S125, S130, S135, S140, and S145, the processor 210 may set processing content according to a predetermined plan rather than setting the process content randomly.

The number C for the types of logo images (i.e., the number C of types (classes)) is not limited to three and may be any number of one or greater, such as one, two, or four.

In S140 the plurality of logo images may be arranged so as to partially overlap one another. Alternatively, parts of the logo images may be deleted.

In S145 one or more of the processes arbitrarily selected from the seven processes P1 through P7 described above may be omitted from the available processes. Alternatively, step S145 may be omitted entirely.

The machine learning model that detects logo images is not limited to the YOLO model described in FIG. 3A but may be an improved YOLO model, such as "YOLO v3." Alternatively, another model may be used as the machine learning model, such as a SSD, R-CNN, Fast R-CNN, Faster R-CNN, or Mask R-CNN.

The target object to be detected by the object detection model is not limited to a logo image, but may be another object, such as a part, a barcode, or the like mounted on a printer. The first dataset DS1 generated in the process of FIG. 4 (or the process of this variation) may be used for training various object detection models.

(2) Various other processes may be performed in place of the process in FIG. 9 for associating information with image data to be used for training a machine learning model. For example, the process for detecting a logo region (S315) may be any of various other processes in place of a process using the logo detection model NN1. For example, the processor 210 may detect a logo image through pattern matching using reference logo image data representing a reference logo image.

Various other processes may be used in place of the process in S325 and S340 for setting an expanded region. For example, the processor 210 may set the expanded region using a single template image specifying a logo region and an expanded region associated with the logo region. Specifically, the processor 210 sets the position of the template image relative to the target image so that the logo region in the target image matches the logo region in the template image. Next, the processor 210 sets the expanded region indicated by the template image at the set position as the expanded region to be applied to the target image.

The target object used for setting the expanded region may be any object, such as a barcode, and is not limited to a logo image. Further, the shape of the target object region specifying the image of the target object (the logo region, for example) may be any other shape in place of a rectangular shape. For example, the shape of the target object region may be a polygon, such as a triangle, a pentagon, or a hexagon, or may be a shape defined by an outline that includes a curved portion, such as a circle or an ellipse. Further, the shape of the target object region may be defined by the outline of the target object.

Other various processes may be used in place of the process in S410 through S430 of FIG. 11 for identifying a uniform region in the target image. Here, a uniform region is a region that satisfies a uniform condition. The uniform condition specifies that the ratio of change in color to change in position in the target image is no greater than a reference value. For example, the edge strength of the block BL may be various values indicating the ratio of change in color to change in position. For example, edge strength may be the difference between a maximum brightness and minimum brightness in the block BL. Further, the processor 210 may identify a uniform region using a histogram of color values (brightness values, for example) for the plurality of pixels in the target image. Specifically, the processor 210 may identify a single contiguous region formed by a plurality of pixels included in one segment of the histogram as a single uniform region. In this case, the uniform condition requires color values to be included in one segment.

In the present embodiment shown in FIGS. 12A through 12C, a single UI screen 600 includes both the first user interface image 610 and the second user interface image 620. In other words, the process to display the UI screen 600 on the display unit 240 includes a process to display the first user interface image 610, and a process to display the second user interface image 620. As an alternative, the processor 210 may display the first user interface image 610 in a different screen from the screen showing the second user interface image 620.

Step S340 may be omitted from FIG. 9. In this case, the processor 210 may set the final candidate region to the unaltered candidate expanded region set in S325. Additionally, the first user interface image 610 may be omitted from the UI screen (FIGS. 12A through 12C).

Step S350 may be omitted from FIG. 9. For example, the processor 210 may select a plurality of sets of candidate sheet class information in S330 and may receive a user designation for sheet class information in S355, regardless of the logo class identified in S315. Step S355 may also be omitted. For example, the processor 210 may select one set of candidate sheet class information associated with the logo class in S330 and may set the sheet class information to sheet class information indicating the candidate sheet class selected in S330, regardless of the logo class identified in S315. Note that sheet class information may be omitted from the annotation information. When the number C of types of label sheets is one, for example, suitable training can be achieved using the second dataset DS2, even if the sheet class information is omitted.

The machine learning model for detecting images of label sheets is not limited to the YOLO model described in FIG. 8A but may be another model, such as YOLO v3, SSD, R-CNN, Fast R-CNN, Faster R-CNN, or Mask R-CNN.

(3) The object being inspected using the machine learning model is not limited to a printer but may be any product, such as a scanner, a multifunction peripheral, a digital camera, a cutting machine, and a portable terminal. Alternatively, the case that accommodates the product may be the object being inspected. Further, the machine learning model may be trained so as to detect various other objects and is not limited to the detection of a label sheet. For example, the machine learning model may detect a part to be mounted in the printer from a photographed image of the printer. In any case, if the image of the detection target (the label sheet, for example) includes an image of a small feature (a logo, for example), an expanded region that includes the feature may be used as the region representing the detection target. When using such an expanded region, annotation information that includes region information indicating the expanded region may be associated with image data for training. Such image data and annotation information may be used for training any of various machine learning models, such as a classification model and is not limited to an object detection model.

(4) The color space for the input image data that is inputted into the machine learning model may be the CMYK color space or another color space rather than the RGB color space. Further, the input image data may represent an image using brightness values. Alternatively, the input image data may be generated by executing various image processes, such as a resolution converting process and a cropping process.

(5) Any method may be used for associating image data with label data. For example, the label data may include identification data that identifies image data associated with the label data. Further, the processor 210 may generate table data indicating correlations between image data and label data. Further, the processor 210 may store the associated image data and label data in a single data file.

(6) The training process for training the machine learning model may be implemented by one of various methods suited to the machine learning model in place of the processes in FIGS. 7 and 13. For example, the loss function used to calculate loss in the present embodiment in FIGS. 7 and 13 may be one of various functions for calculating an evaluation value evaluating the difference between the output data 730 or output data 830 and the label data. When an object detection model is used, for example, the loss function may be one of various functions for calculating loss having correlation with error in the region containing the object, and error in the probability of each object type.

The method of adjusting operation parameters included in the machine learning model may be any of various methods in place of the error backpropagation method, such as a method for propagating the target value (also called "target propagation"). Further, the condition for completing training may be any of various conditions indicating a small difference between the data outputted from the machine learning model and the label data. For example, validation loss may be omitted from the condition for completing training. In this case, all labeled data in the processes of FIGS. 7 and 13 may be used as the training dataset. Additionally, the processor 210 may determine that training is complete when the operator inputs a completion command and may determine that training is not complete when a command to continue training is inputted. The operator may determine that training is complete by referencing output data outputted using the validation dataset, for example. Alternatively, the condition for completing training may be repeatedly calculating training loss and updating the operation parameters (for example, S240 through S250 of FIG. 7 and S540 through S550 of FIG. 13) a prescribed number of times.

(7) The process for generating datasets in FIG. 4, the training process of FIG. 7, the annotation process (process for generating datasets) of FIG. 9, the training process of FIG. 13, and the inspection process (not shown) may be executed by different information processing devices. Any processes selected from these processes may be shared among a plurality of apparatuses (information processing apparatus such as computers) capable of communicating with each other over a network.

In the embodiment and variations described above, part of the configuration implemented in hardware may be replaced with software and, conversely, all or part of the configuration implemented in software may be replaced with hardware. For example, functions of the models NN1 and NN2 in FIG. 1 may be implemented with a dedicated hardware circuit.

When all or some of the functions in the present disclosure are implemented with computer programs, the programs can be provided in a form that the programs are stored on a computer-readable storage medium (a non-transitory computer-readable storage medium, for example). The programs may be used in a stored state in the same storage medium on which they were supplied or in a different storage medium (a computer-readable storage medium). The "computer-readable storage medium" may be a portable storage medium, such as a memory card or a CD-ROM; an internal storage device built into the computer, such as any of various ROM or the like; or an external storage device connected to the computer, such as a hard disk drive or the like.

While the description has been made in detail with reference to specific embodiments and variations thereof, the embodiments and variations have been described for easy understanding to the present disclosure, but it would be apparent to those skilled in the art that various changes and modifications may be made therein without departing from the spirit and scope of the above described embodiments and variations.

What is claimed is:

1. A method for generating a plurality of sets of training image data for training a machine learning model, the machine learning model being used for detecting a target object in an image, the method comprising:

(a) acquiring object image data representing an object image, the object image including a plurality of pixels, the object image data including a plurality of color values corresponding to respective ones of the plurality of pixels;

(b) dividing the object image into T number of partial object images by dividing a region of the object image into T number of partial regions corresponding to respective ones of T number of partial color ranges, the T number of partial color ranges being obtained by clustering on the plurality of color values based on a distribution range of the plurality of color values and dividing the distribution range of the plurality of color values based on the clustering, T being an integer greater than or equal to two;

(c) generating a plurality of sets of color-modified object image data representing respective ones of a plurality of color-modified object images by performing an adjustment process on the object image data, the adjustment process performed on the object image data including a color modification process to modify colors of at least one of the T number of partial object images in the object image, the plurality of color-modified object images including respective ones of a plurality of color-modified partial object images each of which corresponds to a specific partial region included in the T number of partial regions, the plurality of color-modified partial object images having different colors from each other; and (d) generating a plurality of sets of training image data using one or more sets of background image data and the plurality of sets of color-modified object image data, the one or more sets of background image data representing respective ones of one or more background images, the plurality of sets of training image data representing respective ones of a plurality of training images, each of the plurality of training images including a single background image from among the one or more background images and at least one color-modified object image from among the plurality of color-modified object images, the at least one color-modified object image being arranged over the single background image, the plurality of training images including respective ones of mutually different color-modified object images from among the plurality of color-modified object images.

2. The method according to claim 1, wherein the one or more sets of background image data includes background image data representing a photographic background image.

3. The method according to claim 1, wherein the one or more sets of background image data includes background image data representing a solid image of a single color.

4. The method according to claim 1, wherein the adjustment process further includes at least one of a size modification process and an aspect ratio modification process, the size modification process modifying a size of at least one of the plurality of color-modified object images, the aspect ratio modification process modifying an aspect ratio of at least one of the plurality of color-modified object images.

5. The method according to claim 1, wherein the (d) generating comprises:

(e) generating training image data representing a training image including the single background image and at least two color-modified object images from among the plurality of color-modified object images, the at least two color-modified object images being arranged over the single background image.

6. The method according to claim 5, wherein the at least two color-modified object images are arranged over the single background image in the training image so as not to overlap each other.

7. The method according to claim 1, wherein the (d) generating comprises:

(f) generating training image data representing a training image including the single background image, the at least one color-modified object image arranged over the single background image, and another object image arranged over the single background image, the another object image being an image of another object different from each of at least one object corresponding to respective ones of the at least one color-modified object image.

8. The method according to claim 7, wherein the at least one color-modified object image and the another object image are arranged over the single background image in the training image so as not to overlap each other.

9. The method according to claim 1, wherein the (d) generating comprises:

(g) generating training image data by performing an image process on candidate image data representing a candidate image, the candidate image including the single background image and the at least one color-modified object image arranged over the single background image, wherein the image process includes at least one process selected from among:

a vertical flipping process to flip the candidate image about a horizontal axis extending horizontally along the candidate image and passing through a center of the candidate image;

a horizontal flipping process to flip the candidate image about a vertical axis extending vertically along the candidate image and passing through the center of the candidate image;

a rotating process to rotate the candidate image;

a shifting process to translate a portion of the at least one color-modified object image specified in a region of the at least one color-modified object image without modifying the region in the candidate image representing the at least one color-modified object image;

a blurring process to blur the candidate image;

a noise-adding process to add noise to the candidate image; and a color-adjusting process to adjust colors of the candidate image.

10. A system for generating a plurality of sets of training image data for training a machine learning model, the machine learning model being used for detecting a target object in an image, the system comprising:

a controller configured to perform:

(a) acquiring object image data representing an object image, the object image including a plurality of pixels, the object image data including a plurality of color values corresponding to respective ones of the plurality of pixels;

(b) dividing the object image into T number of partial object images by dividing a region of the object image into T number of partial regions corresponding to respective ones of T number of partial color ranges, the T number of partial color ranges being obtained by clustering on the plurality of color values based on a distribution range of the plurality of color values and dividing the distribution range of the plurality of color values based on the clustering, T being an integer greater than or equal to two;

(c) generating a plurality of sets of color-modified object image data representing respective ones of a plurality of color-modified object images by performing an adjustment process on the object image data, the adjustment process performed on the object image data including a color modification process to modify colors of at least one of the T number of partial object images in the object image, the plurality of color-modified object images including respective ones of a plurality of color-modified partial object images each of which corresponds to a specific partial region included in the T number of partial regions, the plurality of color-modified partial object images having different colors from each other; and (d) generating a plurality of sets of training image data using one or more sets of background image data and the plurality of sets of color-modified object image data, the one or more sets of background image data representing respective ones of one or more background images, the plurality of sets of training image data representing respective ones of a plurality of training images, each of the plurality of training images including a single background image from among the one or more background images and at least one color-modified object image from among the plurality of color-modified object images, the at least one color-modified object image being arranged over the single background image, the plurality of training images including respective ones of mutually different color-modified object images from among the plurality of color-modified object images.

11. A non-transitory computer readable storage medium storing a set of computer-readable instructions for a computer configured to generate a plurality of training image data for training a machine learning model, the machine learning model being used for detecting a target object in an image, the set of computer-readable instructions comprising:

(a) acquiring object image data representing an object image, the object image including a plurality of pixels, the object image data including a plurality of color values corresponding to respective ones of the plurality of pixels;

(b) dividing the object image into T number of partial object images by dividing a region of the object image into T number of partial regions corresponding to respective ones of T number of partial color ranges, the T number of partial color ranges being obtained by clustering on the plurality of color values based on a distribution range of the plurality of color values and dividing the distribution range of the plurality of color values based on the clustering, T being an integer greater than or equal to two;

(c) generating a plurality of sets of color-modified object image data representing respective ones of a plurality of color-modified object images by performing an adjustment process on the object image data, the adjustment process performed on the object image data including a color modification process to modify colors of at least one of the T number of partial object images in the object image, the plurality of color-modified object images including respective ones of a plurality of color-modified partial object images each of which corresponds to a specific partial region included in the T number of partial regions, the plurality of color-modified partial object images having different colors from each other; and (d) generating a plurality of sets of training image data using one or more sets of background image data and the plurality of sets of color-modified object image data, the one or more sets of background image data representing respective ones of one or more background images, the plurality of sets of training image data representing respective ones of a plurality of training images, each of the plurality of training images including a single background image from among the one or more background images and at least one color-modified object image from among the plurality of color-modified object images, the at least one color-modified object image being arranged over the single background image, the plurality of training images including respective ones of mutually different color-modified object images from among the plurality of color-modified object images.

* * * * *